(12) United States Patent
Sugiyama et al.

(10) Patent No.: US 7,316,620 B2
(45) Date of Patent: Jan. 8, 2008

(54) CONSTANT VELOCITY UNIVERSAL JOINT

(75) Inventors: Tatsuro Sugiyama, Shizuoka-ken (JP);
Tatsuhiro Goto, Shizuoka-ken (JP);
Kenji Terada, Shizuoka-ken (JP);
Kenta Yamazaki, Shizuoka-ken (JP);
Hisaaki Kura, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 11/515,851

(22) Filed: Sep. 6, 2006

(65) Prior Publication Data

US 2007/0004523 A1 Jan. 4, 2007

Related U.S. Application Data

(62) Division of application No. 10/800,650, filed on Mar. 16, 2004, now Pat. No. 7,118,485, which is a division of application No. 10/339,464, filed on Jan. 10, 2003, now Pat. No. 6,726,570, which is a division of application No. 09/816,775, filed on Mar. 26, 2001, now Pat. No. 6,632,143.

(30) Foreign Application Priority Data

| Mar. 31, 2000 | (JP) | ............................... 2000-98641 |
| Apr. 28, 2000 | (JP) | ............................ 2000-130259 |
| May 9, 2000 | (JP) | ............................ 2000-136212 |

(51) Int. Cl.
*F16D 3/205* (2006.01)

(52) U.S. Cl. ....................................... 464/111; 464/905

(58) Field of Classification Search ................ 464/111, 464/905
See application file for complete search history.

(56) References Cited

U.S. PATENT DOCUMENTS

| 4,773,890 A | 9/1988 | Iwasaki et al. |
| 4,810,232 A | 3/1989 | Farrell et al. |
| 4,886,479 A | 12/1989 | Richtmeyer et al. |
| 5,199,925 A | 4/1993 | Welschof et al. |
| 5,203,741 A | 4/1993 | Turner et al. |
| 5,213,546 A | 5/1993 | Schneider |
| 5,376,049 A | 12/1994 | Welschof et al. |
| 5,507,693 A | 4/1996 | Schwärzler et al. |
| 5,538,473 A | 7/1996 | Busch et al. |

(Continued)

FOREIGN PATENT DOCUMENTS

| FR | 2 779 494 A | 12/1999 |

(Continued)

*Primary Examiner*—Greg Binda
(74) *Attorney, Agent, or Firm*—Arent Fox LLP

(57) ABSTRACT

The tripod member has three trunnions which are projected radially. Each of the trunnions carries a roller, and this roller is accommodated in one of the track grooves in the outer joint member. The outer peripheries of the rollers and the roller guideways make angular contact with each other. Support rings are fitted onto the outer peripheries of the trunnions. These support rings and the rollers are assembled (unitized) via a plurality of needle rollers to constitute roller assemblies capable of relative rotations. In longitudinal sections, the outer peripheries of the trunnions have straight shapes parallel to the axes of the trunnions. In cross sections, the outer peripheries are elliptic in shape, with their respective major axes perpendicular to the axis of the joint. The inner peripheries of the support rings have arcuate convex sections.

6 Claims, 22 Drawing Sheets

U.S. PATENT DOCUMENTS

| | | | |
|---|---|---|---|
| 5,571,047 A * | 11/1996 | Stall et al. ............... 464/111 | |
| 5,788,577 A | 8/1998 | Kadota et al. | |
| 5,989,124 A | 11/1999 | Goto et al. | |
| 6,200,224 B1 | 3/2001 | Sugiyama et al. | |
| 6,475,092 B1 | 11/2002 | Kura et al. | |
| 6,478,682 B1 | 11/2002 | Kura et al. | |
| 6,547,667 B2 | 4/2003 | Sugiyama et al. | |
| 2003/0073501 A1 | 4/2003 | Goto et al. | |

FOREIGN PATENT DOCUMENTS

| JP | 62-233522 A | 10/1987 |
|---|---|---|
| JP | 2-107808 A | 4/1990 |
| JP | 4-211725 A | 8/1992 |
| JP | 04-307116 A | 10/1992 |
| JP | 7-501125 A | 2/1995 |
| JP | 7-069021 A | 3/1995 |
| JP | 9-014280 A | 1/1997 |
| JP | 10-073129 A | 3/1998 |
| JP | 10-080809 A | 3/1998 |
| JP | 10-141383 A | 5/1998 |
| JP | 10-184715 A | 7/1998 |
| JP | 10-238552 A | 9/1998 |
| JP | 11-270572 A | 10/1999 |
| JP | 11-278075 A | 10/1999 |
| JP | 11-336783 A | 12/1999 |
| JP | 11-336784 A | 12/1999 |
| JP | 2000-018267 A | 1/2000 |
| JP | 2000-027879 A | 1/2000 |
| JP | 2000-027880 A | 1/2000 |
| JP | 2000-039028 A | 2/2000 |
| WO | 93/08409 A1 | 4/1993 |
| WO | 00/53944 A | 9/2000 |

* cited by examiner

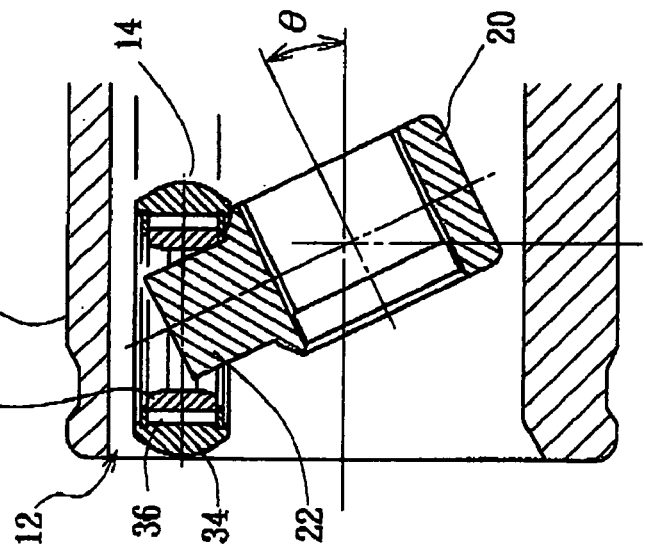
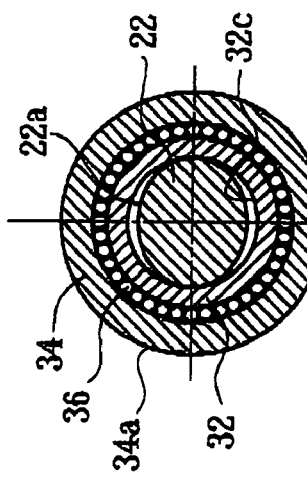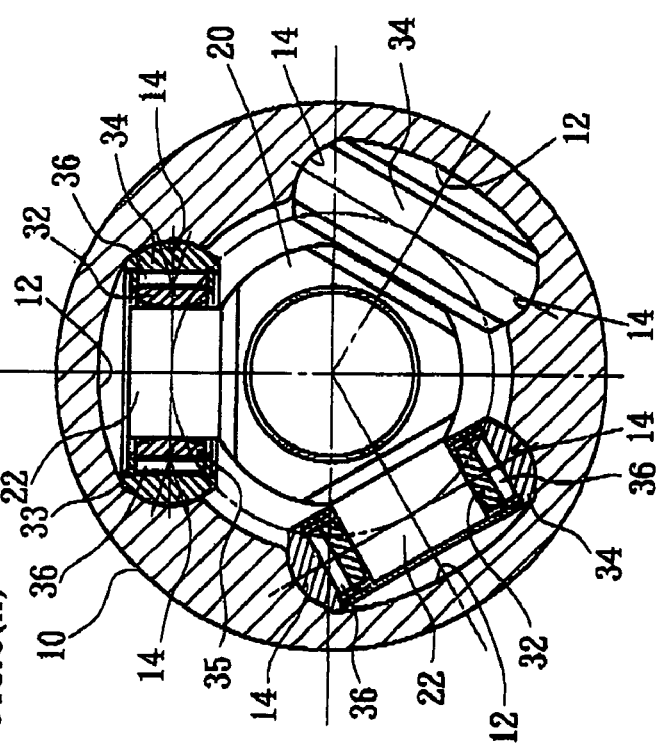

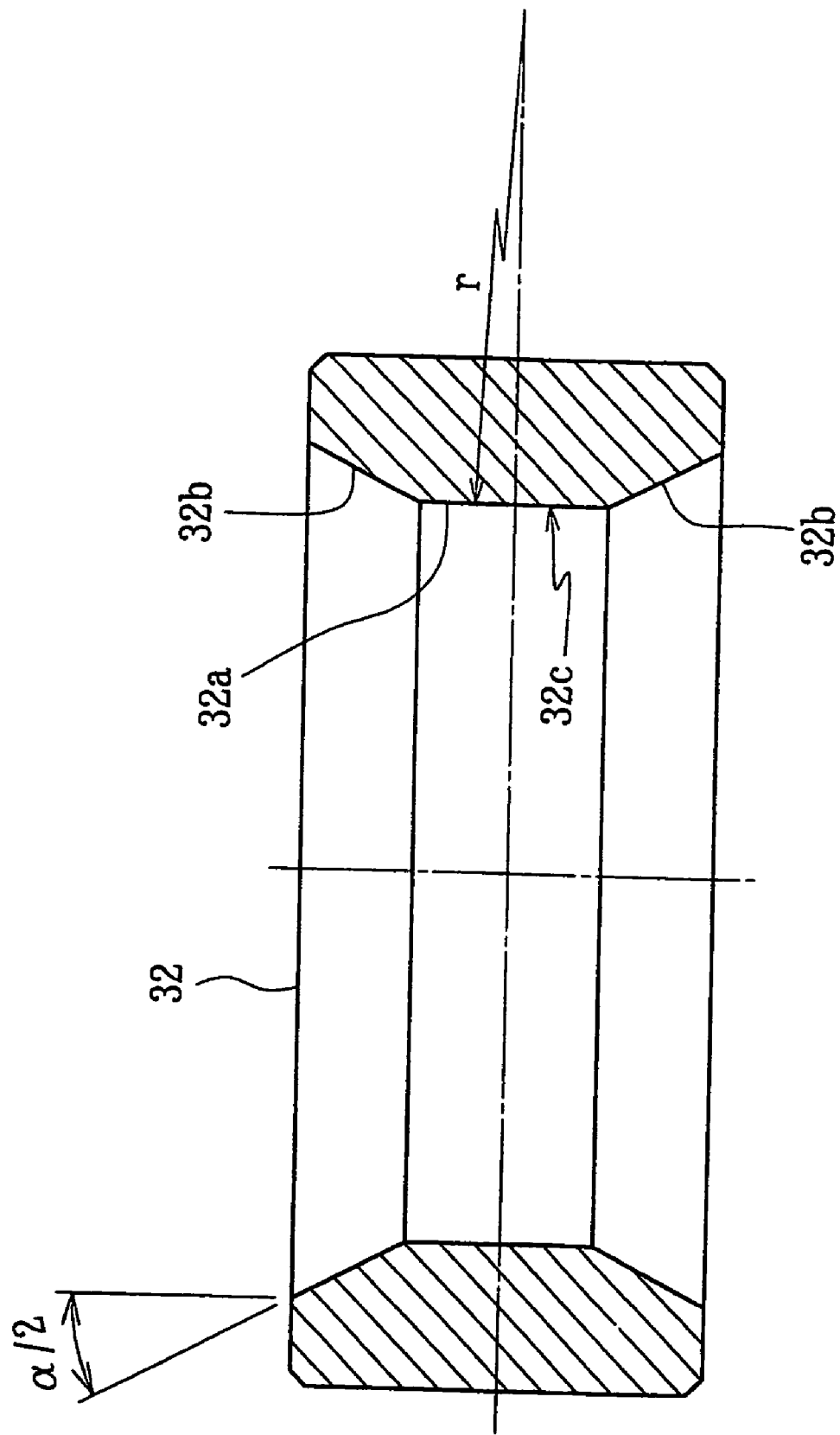

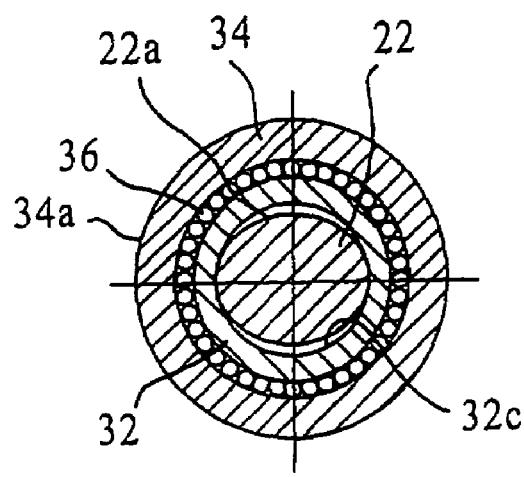
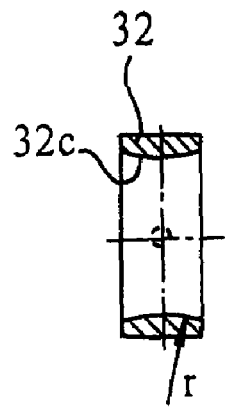
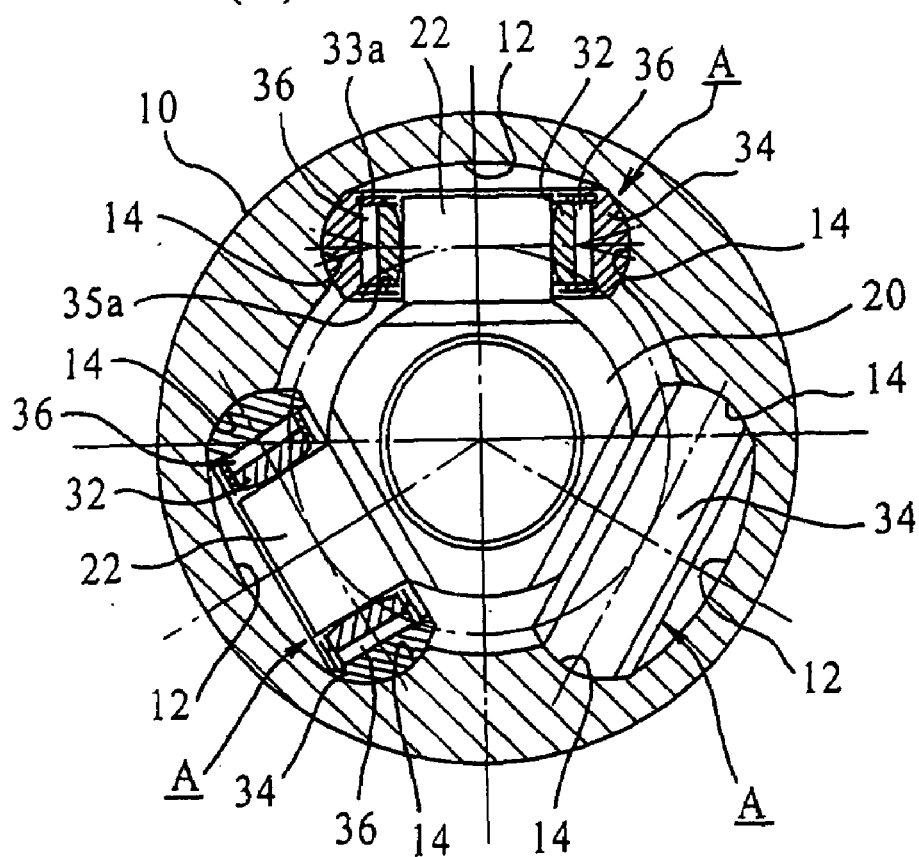

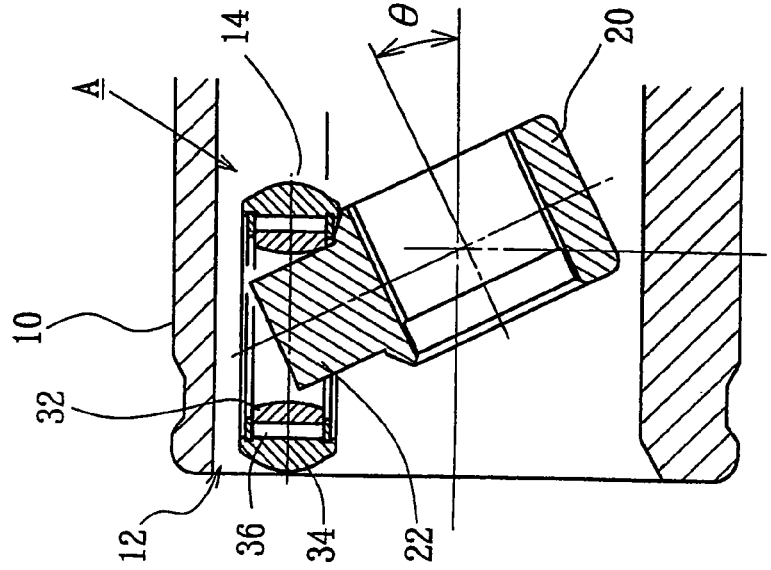
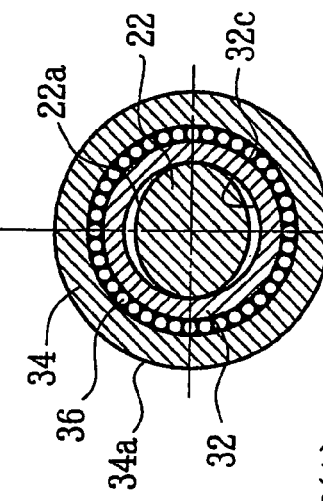
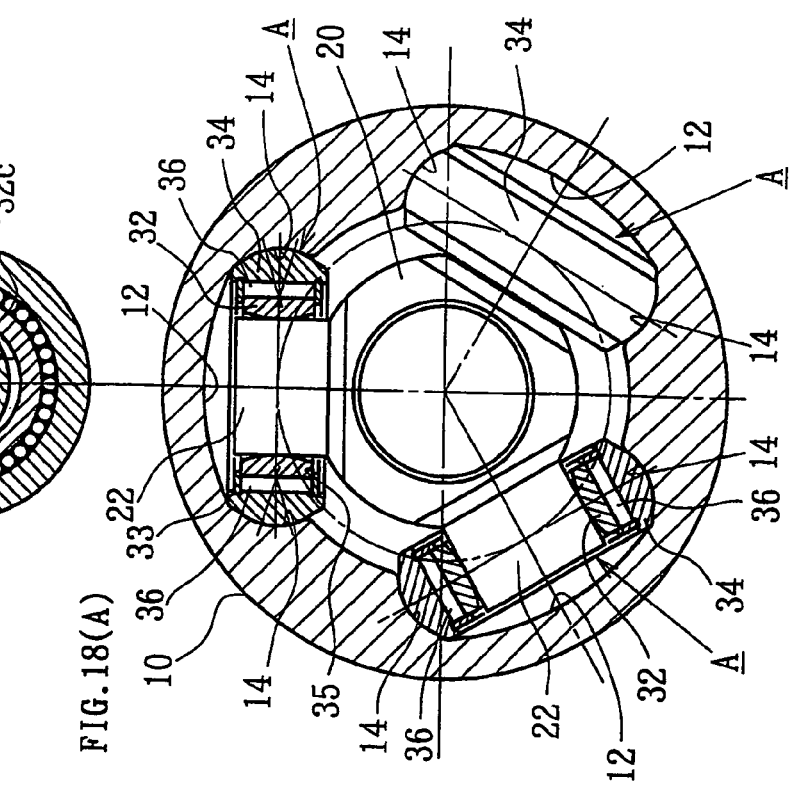

CONSTANT VELOCITY UNIVERSAL JOINT

CROSS-REFERENCE TO RELATED APPLICATIONS

This is a Divisional Application, which claims the benefit of U.S. patent application Ser. No. 10/800,650, filed Mar. 16, 2004, now U.S. Pat. No. 7,118,485, issued Oct. 10, 2006, which in turn is a Divisional application of Parent application Ser. No. 10/339,464, filed Jan. 10, 2003, now U.S. Pat. No. 6,726,570, issued Apr. 27, 2004, which in turn is a divisional application of Parent application Ser. No. 09/816,775, filed Mar. 26, 2001, now U.S. Pat. No. 6,632,143, issued Oct. 14, 2003. The disclosure of the prior application is hereby incorporated herein in its entirety by reference.

BACKGROUND OF THE INVENTION

The present invention relates to a constant velocity universal joint for use in power transmission devices in motor vehicles and various industrial machines. In particular, the invention relates to a tripod type constant velocity universal joint.

Tripod type constant velocity universal joints are used, for example, as an element in a power transmission device for transmitting rotational power from a car engine to wheels (as a joint for coupling drive shafts or propeller shafts).

In general, a tripod type constant velocity universal joint is chiefly composed of an outer joint member and a tripod member. The outer joint member has an inner periphery provided with three track grooves, each of which has axial roller guideways on both sides. The tripod member has three radially-projecting trunnions. A roller is rotatably arranged on each of the trunnions. The trunnions of the tripod member and the roller guideways in the outer joint member engage with each other in the direction of rotation via the rollers so that rotational torque is transmitted from a drive side to a driven side at constant velocity. The individual rollers rotate about the trunnions and roll on the roller guideways as well, absorbing relative axial displacements and angular displacements between the outer joint member and the tripod member. In the meantime, also absorbed are axial displacements of the individual trunnions to the roller guideways, the axial displacements resulting from phase changes in the direction of rotation when the outer joint member and the tripod member transmit rotational torque with some operating angle therebetween.

Among factors contributing to the vibration characteristics of a constant velocity universal joint of this type are induced thrust and slide resistance. The induced thrust is a periodic varying force produced by friction between internal parts of the constant velocity universal joint when the joint transmits rotational torque with an operating angle. That is, due to the rotational motion, the individual trunnions of the tripod member and the rollers inevitably repeat relative axial reciprocation to the roller guideways. In that case, friction occurs at such portions as between the rollers and the roller guideways, and between the rollers and the trunnions. This friction produces the induced thrust. Thus, the induced thrust is a varying force inherent in a constant velocity universal joint, inevitably occurring in relation to the internal structure and rotational motion of the joint. In the case of a tripod type constant velocity universal joint, the induced thrust consists chiefly of a variation component of third order (tertiary rotational component) because the numbers of trunnions and rollers are three. Meanwhile, the slide resistance is a periodic varying force produced by friction between the internal parts when external vibrations are input to the constant velocity universal joint under torque. In other words, the slide resistance indicates the vibration transfer characteristics of the constant velocity universal joint.

For the power transmission device of a motor vehicle, the vibrations resulting from the induced thrust and slide resistance of the constant velocity universal joint are rather small in level as compared with engine vibrations and the like, and thus matter little by themselves. Nevertheless, the vibrations, if approaching the engine vibrations and the like in frequency, cause resonance phenomena. The induced thrust causes the rolling of a car body at starts and under acceleration, as well as muffled noise, beat noise, and so on. The slide resistance causes an increase of idling vibrations and the like (in particular, affecting the Drive or D-range idling vibrations). Accordingly, the induced thrust and slide resistance in the constant velocity universal joint have significant influence on the NVH (noise vibration harshness) performances of the motor vehicle. In particular, the induced thrust is ever increasing in the degree of influence on the NVH performances, with widening regular-use angles (vehicle-mounted angles) of the joint and increasing torque in recent times. Then, in terms of vehicle design, it means that the values of the induced thrust and slide resistance of constant velocity universal joints constitute greater constraints on the layout design of power transmission systems.

SUMMARY OF THE INVENTION

An object of the present invention is to regulate the induced thrust and slide resistance of a constant velocity universal joint, thereby easing the constraints on the layout design of a power transmission system and providing a constant velocity universal joint of low vibration and high reliability in quality.

Another object of the present invention is to further reduce and stabilize the induced thrust and slide resistance of a constant velocity universal joint, and then provide a constant velocity universal joint that is excellent in durability, productivity, and strength, low in vibration, and compact in size.

To achieve the foregoing objects, the present invention provides a constant velocity universal joint including: an outer joint member having three track grooves formed in its inner periphery, each of the track grooves having axial roller guideways on both sides; a tripod member having three radially-projecting trunnions; and rollers respectively arranged on the trunnions of the tripod member, the rollers being guided by the roller guideways. Here, at least either induced thrust or slide resistance is regulated within a specification. This increases the reliability as to the induced thrust and/or slide resistance of the constant velocity universal joint, thereby easing the constraints on the layout design of the power transmission system and improving the design flexibility. The constant velocity universal joint also improves in vehicle mountability. Moreover, the reliability as to the vibration characteristics of the constant velocity universal joint increases to contribute to stabilized NVH performances of a vehicle.

Specifically, the number of revolutions R=100-500 (rpm) and an operating angle .=0-14 (deg) are employed as common conditions. Then, under load torque T=0.1×Ts (N·m) {condition (X1)}, the tertiary rotational component of the induced thrust may be regulated to or below 30 N (RMS: Root Mean Square), or preferably to or below 20 N (RMS). Under load torque T=0.2×Ts (N·m) {condition (X2)}, the tertiary rotational component of the induced thrust may be regulated to or below 55 N (RMS), or preferably to or below 35 N (RMS). Under load torque T=0.3×Ts (N·m) {condition (X3)}, the tertiary rotational component of the induced thrust may be regulated to or below 80 N (RMS), or preferably to or below 55 N (RMS). These regulations allow the provision of a constant velocity universal joint of low vibration and high quality reliability, aside from the effects described above. They also contribute to improved NVH performances of a motor vehicle.

Furthermore, with the number of revolutions R=0 (rpm), an operating angle .=0-10 (deg), load torque T=98-196 (N·m), and a vibrating frequency f=15-40 (Hz) as common conditions, the slide resistance may be regulated to or below 40 N (peak to peak) under vibrating amplitude=±0.01 to ±0.03 (mm) {condition (Y1)}. Under vibrating amplitude=±0.05 to ±0.08 (mm) {condition (Y2)}, the slide resistance may be regulated to or below 60 N (peak to peak). Under vibrating amplitude=±0.10 to ±0.25 (mm) {condition (Y3)}, the slide resistance may be regulated to or below 80 N (peak to peak). Here, the "peak to peak" means the total of the absolute values of positive and negative peak values. These regulations allow the provision of a constant velocity universal joint of low vibration and high quality reliability, aside from the effects described above. They also contribute to improved NVH performances of a motor vehicle.

In the configurations described above, it is preferable to provide roller assemblies for allowing tilting movements of the rollers with respect to the trunnions. These roller assemblies may include the rollers and support rings for supporting the rollers rotatably, the support rings being fitted onto the outer peripheries of the trunnions. Here, the inner peripheries of the support rings have an arcuate convex section. The outer peripheries of the trunnions are straight in a longitudinal section, and so shaped in a cross section as to make contact with the inner peripheries of the support rings in directions perpendicular to the axis of the joint and create clearances with the inner peripheries of the support rings in the axial direction of the joint. In this configuration, the roller assemblies that include the rollers and the support rings make unitary tilting movements with respect to the trunnions. Here, the term "tilting movements" refers to the tilts the axes of the support rings and rollers make with respect to the axes of the trunnions, within the planes containing the axes of the trunnions.

The cross-sectional shape of such a trunnion as makes contact with the inner periphery of a support ring in a direction perpendicular to the axis of the joint and creates a clearance with the inner periphery of the support ring in an axial direction of the joint translates into that the faces opposed to each other in the axial direction of the tripod member retreat toward each other, i.e., to smaller diameters than the diameter of an imaginary cylindrical surface. Among concrete examples thereof is a generally elliptic shape. The term "generally elliptic shape", includes not only literal ellipses, but also other shapes generally referred to as ovals and the like.

Due to the change of their cross sections from the conventional circular shape to the shape described above, the trunnions can tilt with respect to the outer joint member without changing the orientation of the roller assemblies when the joint operates with an operating angle. Besides, the contacting ellipses of the support rings with the outer peripheries of the trunnions approach from oblongs to points in shape. This reduces friction moments that act to tilt the roller assemblies. As a result, the roller assemblies are stabilized in orientation, whereby the rollers are retained parallel to the roller guideways for smooth rolling. This means reductions of the induced thrust and slide resistance, accompanied with a narrowed range of variations of these values. Accordingly, in the constant velocity universal joint of this configuration, the specifications of the induced thrust and slide resistance can be made smaller as described above. Besides, these values can be accurately regulated within the specifications. This results in a low-vibration constant velocity universal joint of higher reliability.

The roller assemblies are interposed between the trunnions and the outer joint member for the sake of torque transmission. In constant velocity universal joints of this kind, the transmission direction of torque is always perpendicular to the axis of the joint. Therefore, as long as they make contact in the transmission direction of torque, the trunnions and the support rings can perform torque transmission without trouble even when they have clearances therebetween in the axial directions of the joint.

In the configurations described above, the generator to the inner peripheries of the support rings may consist of a combination of an arc portion at the center and relief portions on both sides. The arc portion preferably has such a radius of curvature as allows 2-3' tilts of the trunnions. In addition, a plurality of rolling elements maybe interposed between the support rings and the rollers so as to make the support rings and the rollers capable of relative rotations. The rolling elements may be needle rollers. Furthermore, the outer peripheries of the rollers may be formed into a spherical shape (perfect spherical surfaces or torus surfaces) so that the spherical outer peripheries of the rollers and the roller guideways in the outer joint member make angular contact with each other. The angular contact between the rollers and the roller guideways makes the rollers less prone to vibrate, thereby stabilizing the orientation of the rollers. As a result, the rollers can roll on the roller guideways with smaller resistance when moving along the axial direction of the outer joint member. The specific configurations to establish such angular contact include tapered or Gothic arch cross sections of the roller guideways.

The roller assemblies may include the rollers and support rings for supporting the rollers rotatably, the support rings being fitted onto the outer peripheries of the trunnions, wherein the outer peripheries of the trunnions have a convex spherical shape and the inner peripheries of the support rings have a cylindrical or conical shape. In this configuration, the roller assemblies including the rollers and the support rings make unitary tilting movements with respect to the trunnions.

According to this invention, the following effects are obtained.

(1) At least either the induced thrust or the slide resistance is regulated within the specifications, and the reliability as to these characteristics is high. This eases the constraints on the layout design of the power transmission system and improves the design flexibility. Besides, the constant velocity universal joint also improves in vehicle mountability. Moreover, the reliability as to the vibration characteristics of the constant velocity universal joint increases to contribute to stabilized NVH performances of a vehicle.

(2) The tertiary rotational component of the induced thrust is regulated to or below 30 N (RMS) under the condition (X1), to or below 55 N (RMS) under the condition (X2), or to or below 80 N (RMS) under the condition (X3). In addition to the effect (1) described above, these regulations achieve a reduction and stabilization of the induced thrust, thereby making it possible to provide a constant velocity universal joint having excellent low-vibration characteristics and high reliability. This contributes to improved NVH performances of a motor vehicle. Moreover, the constant velocity universal joint becomes capable of regular use at wider angles, which has been difficult, with a further improvement in its vehicle mountability.

(3) Furthermore, the slide resistance is regulated to or below 40 N (peak to peak) under the condition (Y1), to or below 60 N (peak to peak) under the condition (Y2), or to or below 80 N (peak to peak) under the condition (Y3). In addition to the effects (1) and (2) described above, these regulations achieve a reduction and stabilization of the slide resistance, thereby making it possible to provide a constant velocity universal joint having excellent low-vibration characteristics and high reliability. This contributes to improved NVH performances of a motor vehicle.

To achieve the foregoing objects, the present invention also provides a constant velocity universal joint including: an outer joint member having three track grooves each having circumferentially-opposed roller guideways; a tripod member having three radially-projecting trunnions; rollers inserted into the track grooves; and rings fitted onto the trunnions, for supporting the rollers rotatably; the rollers being capable of moving along the roller guideways in the axial direction of the outer joint member. Here, letting $T_{PCD}$ stand for the pitch circle diameter of the track grooves and $S_{PCD}$ for the pitch circle diameter of a spline hole formed in the tripod member, the ratio $T_{PCD}/S_{PCD}$ is set within the range of 1.7-2.1. The ratio of the diameter $D_J$ of the trunnions to the pitch circle diameter $S_{PCD}$ of the spline hole, or $D_J/S_{PCD}$, is set within the range of 0.6-1.0. The ratio of the diameter $D_R$ of the rollers to the pitch circle diameter $S_{PCD}$ of the spline hole, or $D_R/S_{PCD}$, is set within the range of 1.4-2.3.

In a tripod type constant velocity universal joint for use in a motor vehicle's power transmission system, the pitch circle diameter $S_{PCD}$ of the spline hole in the tripod member is determined by the strength required of the joint. Meanwhile, the outer diameter $D_O$ of the outer joint member is limited since the joint must be mounted on a predetermined space in a vehicle. Thus, the individual parts of the constant velocity universal joint need to be put into appropriate dimensional proportions to one another. The ratio $T_{PCD}/S_{PCD}$ defines the pitch circle diameter $T_{PCD}$ of the track grooves. More specifically, if the track grooves are made so small in pitch circle diameter $T_{PCD}$ that the ratio $T_{PCD}/S_{PCD}$ falls below 1.7, there arises a problem of interference between the rollers and the shoulders of the trunnions. Besides, the surface pressures at the contact portions, such as between the trunnions and the rings, increase to cause a drop in durability. On the other hand, if the track grooves are made so large in pitch circle diameter $T_{PCD}$ that the ratio $T_{PCD}/S_{PCD}$ exceeds 2.10, the outer joint member increases in outer diameter $D_O$ with deterioration in vehicle mountability. Additionally, given that the outer diameter of the outer joint member is fixed, there remains little space for the roller assemblies.

The ratio $D_J/S_{PCD}$ defines the diameter $D_J$ of the trunnions. More specifically, if the trunnions are made so small in major diameter $D_J$ that the ratio $D_J/S_{PCD}$ falls below 0.6, the constant velocity universal joint cannot function satisfactory. On the other hand, if the trunnions are made so large in major diameter that the ratio $D_J/S_{PCD}$ exceeds 1.0, there remains little space for the roller assemblies to be arranged in, which is dissatisfactory in terms of the limit in the outer diameter.

The ratio $D_R/S_{PCD}$ defines the diameter $D_R$ of the rollers. More specifically, if the rollers are made so small in outer diameter $D_R$ that the ratio $D_R/S_{PCD}$ falls below 1.4, the surface pressures between the rollers and the roller guideways increase to drop the durability. Besides, the reduction in the thickness of the rollers causes a problem of deteriorated strength. Meanwhile, when the rollers are made so large in outer diameter $D_R$ that the ratio $D_R/S_{PCD}$ exceeds 2.3, the outer joint member becomes thinner to drop in forgeability if the diameter $D_O$ of the outer joint member is given. This also produces a problem of shaft interference, as well as advances interference of the outer joint member with cup bottoms, yielding an increased cup depth and a greater weight.

In the configuration described above, the rings may be shaped into a spherical cross section while the trunnions are so shaped in a cross section as to make contact with the inner peripheries of the rings in directions perpendicular to the axis of the joint and create clearances with the inner peripheries of the rings in the axial direction of the joint. Besides, the ratio $T_{PCD}/S_{PCD}$ is set within the range of 1.72-2.10. The ratio of the dimension $D_{JL}$ of the trunnions in the directions perpendicular to the axis of the joint to the pitch circle diameter $S_{PCD}$ of the spline hole, or $D_{JL}/S_{PCD}$, is set within the range of 0.63-0.94. The ratio $D_R/S_{PCD}$ is set within the range of 1.47-2.21.

Here, the cross-sectional shape of such a trunnion as makes contact with the inner periphery of a ring in a direction perpendicular to the axis of the joint and creates a clearance with the inner periphery of the ring in an axial direction of the joint translates into that the faces opposed to each other in the axial direction of the tripod member retreat toward each other, i.e., to smaller diameters than the diameter of an imaginary cylindrical surface. Among concrete examples thereof is an ellipse. The term "ellipse" includes not only literal ellipses, but also other shapes generally referred to as ovals and the like.

Due to the change of their cross sections from the conventional circular shape to the shape described above, the trunnions can tilt with respect to the outer joint member without changing the orientation of the roller assemblies when the joint operates with an operating angle. Besides, the contacting ellipses of the rings with the outer peripheries of the trunnions approach from oblongs to points in shape. This reduces friction moments that act to tilt the roller assemblies. As a result, the roller assemblies are stabilized in orientation, whereby the rollers are retained parallel to the roller guideways for smooth rolling. This contributes to a reduction of the slide resistance, and by extension to the reduction of the induced thrust. There is an additional advantage in that the trunnions improve in flexural strength due to increased section moduli at the bottom portions of the trunnions.

More specifically, the adoption of the cross-sectional shapes of the trunnions as described above eases the contact pressures against the rings and avoids a drop in the strength of the trunnions. Besides, the trunnions can tilt without inclining the rings. This prevents the rollers from inclination and allows the rollers to roll smoothly on the roller guideways. As a result, it becomes possible to omit collars which are sometimes arranged on the track grooves of the outer joint member with an aim to restrain the inclination of the rollers. The omission of the collars not only reduces the outer joint member in weight and simplifies the machining thereto, but also eliminates the slide contacts between the rollers and the collars. This consequently achieves a further decrease of the slide resistance and a reduction of the induced thrust.

The roller assemblies are interposed between the trunnions and the outer joint member for the sake of torque transmission. In constant velocity universal joints of this kind, the transmission direction of torque is always perpendicular to the axis of the joint. Therefore, as long as they make contact in the transmission direction of torque, the trunnions and the support rings can perform torque transmission without trouble even when they have clearances therebetween in the axial directions of the joint.

The numerical ranges of the ratio $T_{PCD}/S_{PCD}$, the ratio $D_{JL}/S_{PCD}$, and the ratio $D_R/S_{PCD}$ are determined on the bases fundamentally identical to those described above.

Moreover, in the configuration described above, the ratio of the outer diameter $D_O$ of the outer joint member to the pitch circle diameter $S_{PCD}$ of the spline hole, or $D_O/S_{PCD}$, may be set within the range of 2.78-3.77. The ratio $D_O/S_{PCD}$ defines the diameter $D_O$ of the outer joint member. More specifically, if the outer joint member is made so small in outer diameter $D_O$ that the ratio $D_O/S_{PCD}$ falls below 2.78, the surface pressures at the individual contact portions increase to lower the durability. In addition, the stresses on the individual parts increase to cause deterioration in strength. On the other hand, increasing the outer diameter $D_o$ of the outer joint member to such an extent that the ratio $D_O/S_{PCD}$ exceeds 3.77 not only deteriorates the vehicle mountability but also yields a weight increase.

Moreover, in the configuration described above, the ratio of the barrel width $H_T$ of the tripod member to the pitch circle diameter $S_{PCD}$ of the spline hole, or $H_T/S_{PCD}$, may be set within the range of 0.81-1.22. The ratio $H_T/S_{PCD}$ defines the width $H_T$ of the tripod member. If the tripod member is made so small in width $H_T$ that the ratio $H_T/S_{PCD}$ falls below 0.81, the length of the spline fit decreases to lower the spline strength. On the other hand, if the tripod member is made so large in width $H_T$ that the ratio $H_T/S_{PCD}$ exceeds 1.22, there arises a problem of interference between the rollers and the shoulders of the trunnions.

Moreover, in the configuration described above, the ratio of the width $H_R$ of the rollers to the pitch circle diameter $S_{PCD}$ of the spline hole, or $H_R/S_{PCD}$, may be set within the range of 0.38-0.67. The ratio $H_R/S_{PCD}$ defines the width $H_R$ of the rollers. More specifically, if the rollers are made so small in width that the ratio $H_R/S_{PCD}$ falls below 0.38, the surface pressures between the rollers and the roller guideways increase to drop the durability. Besides, the reduction in the rigidity of the rollers results in insufficient strength. Meanwhile, when the rollers are made so large in width $H_R$ that the ratio $H_R/S_{PCD}$ exceeds 0.67, the rollers come into interference with the shoulders of the trunnions. Moreover, if the outer diameter of the outer joint member is given, the outer joint member becomes thinner to drop in forgeability.

Moreover, in the configuration described above, the ratio of the radius of curvature $R_R$ of the rollers' outer peripheries to the pitch circle diameter $S_{PCD}$ of the spline hole, or $R_R/S_{PCD}$, may be set within the range of 0.19-1.11. The ratio $R_R/S_{PCD}$ defines the radius of curvature $R_R$ of the rollers' outer peripheries. More specifically, if the outer peripheries of the rollers are made so small in the radius of curvature that the ratio $R_R/S_{PCD}$ falls below 0.19, the rollers yield drop in rigidity into insufficient strength. Meanwhile, when the outer peripheries of the rollers are made so large in the radius of curvature that the ratio $R_R/S_{PCD}$ exceeds 1.11, the outer joint member becomes thinner to drop in forgeability if the diameter $D_O$ of the outer joint member is given.

According to this invention, the following effects are obtained.

(1) The dimensions of the individual parts of the constant velocity universal joint are brought into appropriate proportions to one another. Besides, configurations for a constant velocity universal joint with excellent low-vibration characteristics are provided.

(2) In particular, the rings are shaped into a spherical cross section while the trunnions are so shaped in a cross section as to make contact with the inner peripheries of the rings in directions perpendicular to the axis of the joint and create clearances with the inner peripheries of the rings in the axial direction of the joint. This allows the trunnions to tilt with respect to the outer joint member without changing the orientation of the roller assemblies when the joint operates with an operating angle. Besides, the contacting ellipses of the rings with the outer peripheries of the trunnions approach from oblongs to points in shape, which reduces friction moments that act to tilt the roller assemblies. In addition, the contacts between the trunnions and the inner peripheries of the rings always stay at the width centers of the rings. Therefore, even when rolling elements such as needle rollers are interposed between the rings and the rollers, these rolling elements make stable rolling. As a result, the roller assemblies are stabilized in orientation, whereby the rollers are retained parallel to the roller guideways for smooth rolling. This contributes to a reduction of the slide resistance, and by extension to the reduction of the induced thrust. There is an additional advantage in that the trunnions improve in flexural strength due to increased section moduli at the bottom portions of the trunnions.

(3) The constant velocity universal joints of the present invention, when applied to a motor vehicle's drive shaft in particular, can contribute to improvements in automotive NVH performances associated with the slide resistance and induced thrust, thereby increasing design flexibility of portions around the axles of the vehicle.

Now, with an eye to yet an effective reduction and the stabilization of the induced thrust and slide resistance, the following considerations can be made.

From among the constant velocity universal joints of the present invention having been described, take, for example, the one in which: the inner peripheries of the support rings have an arcuate convex section; and the outer peripheries of the trunnions are straight in a longitudinal section, and so shaped in a cross section as to make contact with the inner peripheries of the support rings in directions perpendicular to the axis of the joint and create clearances with the inner peripheries of the support rings in the axial direction of the joint. As exaggeratedly shown in FIG. 26, slight radial clearances exist between the parts constituting each roller assembly A (between the roller 34 and the needle rollers 36, between the support ring 32 and the needle rollers 36), between the roller 34 and the roller guideway 14, and between the support ring 32 and the trunnion 22 when the joint is put under no load. Therefore, as exaggeratedly shown in FIG. 27, when a load is applied to among the trunnion 22, the roller assembly A, and the roller guideway 14 to reduce the clearances mentioned above in rotational torque transmission, the axis X of the trunnion 22 tilts with respect to the axis Y of the roller assembly A by the amount corresponding to the clearances mentioned above (tilt angle .) within the plane of the diagram (within a section perpendicular to the axis of the joint). This tilt of the trunnion 22 deviates the direction of the load F applied to the contact portion S between the trunnion 22 and the roller assembly A (the contact point between the outer periphery 22a of the trunnion 22 and the inner periphery 32c of the support ring 32) from the direction of torque transmission (the direction of the tangent at the contact point S to a circle about the joint center O) to an inward direction. This produces a component of force f directed to the trunnion bottom (hereinafter, this component of force will be referred to as "inward component f"). Moreover, the support ring 32 and the lock rings 33, 35 also have slight axial clearances therebetween, so that the support ring 32 can make an axial relative shift with respect to the roller 34 by the amount corresponding to the axial clearances. Thus, when the above-described inward component f is applied, the support ring 32 makes a relative shift toward the trunnion bottom and comes into contact with the lock ring 35. Accordingly, the center line L1 passing through the center of curvature of the inner periphery 32s of the support ring 32 makes a .h shift toward the trunnion bottom from the center line L2 passing through the center of curvature of the outer periphery 34a of the roller 34. This consequently promotes the inward component f in magnitude. Then, due to such an inward component f, the roller assembly A makes a clockwise tilt within the plane of the diagram, with respect to the roller guideway 14. This increases the chances for the outer periphery 34a of the roller 34 to contact with the trunnion-bottom side of the roller guideway 14 in the non-load direction (not shown). Therefore, the smooth rolling of the roller 34 is sometimes hampered to affect the induced thrust and slide resistance of the joint.

In view of the foregoing considerations, the present invention provides a constant velocity universal joint including: an outer joint member having three axial track grooves formed in its inner periphery, each of the track grooves having axial roller guideways on both sides; a tripod member having three radially-projecting trunnions; and roller assemblies respectively mounted on the trunnions of the tripod member; the roller assemblies including rollers to be guided along the roller guideways in directions parallel to the axis of the outer joint member and support rings for supporting the rollers rotatably, the roller assemblies being capable of tilting movements with respect to the trunnions. Here, the constant velocity universal joint further includes tilt suppressing means for suppressing tilts of the roller assemblies within a cross section perpendicular to the axis of the joint due to inward components of load applied to contact portions between the trunnions and the roller assemblies. Here, the term "inward components" refers to components of loads toward the trunnion bottoms, resulting from an inward deviation of the loads applied to the contact portions between the trunnions and the roller assemblies from the direction of torque transmission.

For the-tilt suppression means mentioned above, a configuration may be adopted in which two-point angular contact is established between the outer peripheries of the rollers and the roller guideways, and the contact angle at angular contact points on the trunnion-bottom sides is made greater than the contact angle at angular contact points on the trunnion-extremity sides. According to this configuration, the angular contact between the rollers and the roller guideways stabilizes the orientation of the rollers with respect to the roller guideways. In addition, since the contact angle at the angular contact points on the trunnion-bottom sides is made greater than the contact angle at the angular contact points on the trunnion-extremity sides, the inward components can be exerted higher at the angular contact points on the trunnion-bottom sides. Accordingly, the tilts of the roller assembly within a section perpendicular to the axis of the joint are suppressed to ensure smooth rolling of the rollers. Incidentally, the roller guideways may be shaped to Gothic arch, tapered (V-shaped), or parabolic cross sections so as to achieve the angular contact.

Moreover, the tilt suppressing means may adopt a configuration in which the outer peripheries of the rollers are shaped into arcuate convex sections having the centers of curvature in the vicinities of lines parallel to the axes of the rollers, the lines passing through the contact portions. According to this configuration, the above-mentioned contact portions, or the points of application of the inward components, and the centers of curvature of the outer peripheries of the rollers, or the fulcrums of the tilts of the roller assemblies, are brought near to or coincident with each other in the radial directions of the roller assemblies. This reduces the tilting moments acting on the roller assemblies. Therefore, the tilts of the roller assemblies within a section perpendicular to the axis of the joint are suppressed to ensure the smooth rolling of the rollers.

The above-described constant velocity universal joint may employ such a configuration as includes the rollers to be guided by roller guideway and support rings for supporting the rollers rotatably, wherein: the inner peripheries of the support rings have an arcuate convex section; and the outer peripheries of the trunnions are straight in a longitudinal section, and so shaped in a cross section as to make contact with the inner peripheries of the support rings in directions perpendicular to the axis of the joint and create clearances with the inner peripheries of the support rings in the axial direction of the joint.

The cross-sectional shape of such a trunnion as makes contact with the inner periphery of a support ring in a direction perpendicular to the axis of the joint and creates a clearance with the inner periphery of the support ring in an axial direction of the joint translates into that the faces opposed to each other in the axial direction of the tripod member retreat toward each other, i.e., to smaller diameters than the diameter of an imaginary cylindrical surface. Among concrete examples thereof is a generally elliptic shape. The term "generally elliptic shape" includes not only literal ellipses, but also other shapes generally referred to as ovals and the like.

Due to the change of their cross sections from the conventional circular shape to the shape described above, the trunnions can tilt with respect to the outer joint member without changing the orientation of the roller assemblies (roller assemblies) when the joint operates with an operating angle. Besides, the contacting ellipses of the support rings with the outer peripheries of the trunnions approach from oblongs to points in shape. This reduces friction moments that act to tilt the roller assemblies. As a result, the roller assemblies are stabilized in orientation, whereby the rollers are retained parallel to the roller guideways for smooth rolling. This contributes to a reduction of the slide resistance, and by extension to the reduction of the induced thrust.

In the configuration described above, the generator to the inner peripheries of the support rings may consist of a combination of an arc portion at the center and relief portions on both sides. The arc portion preferably has such a radius of curvature as allows 2-3' tilts of the trunnions.

In the constant velocity universal joint of the above-described configuration, axial relative movements of the rollers and the support rings can be retained from both sides by lock means such as lock rings and lock collars, so as to ensure the unity of the roller assemblies as assemblies. Nevertheless, axial clearances must be secured between the rollers/support rings and the lock means. Then, the support rings are still capable of axial relative movements to the rollers by the amounts corresponding to the axial clearances. Therefore, when the above-described inward components are applied, the support rings make relative movements toward the trunnion bottoms, with respect to the rollers. Accordingly, the center lines passing through the centers of curvature of the inner peripheries of the support rings make a shift toward the trunnion bottoms, from the center lines passing through the centers of curvature of the outer peripheries of the rollers. As a result, the inward components are promoted in magnitude. To prevent this, the above-described tilt suppressing means may adopt such a configuration as establishes coincidence between the center lines passing through the respective centers of curvature of the outer peripheries of the rollers and the center lines passing through the respective centers of curvature of the inner peripheries of the support rings when the support rings make relative movements to the trunnion bottoms with respect to the rollers due to clearances between parts that constitute the roller assemblies. This configuration reduces the above-described inward components. As a result, the tilts of the roller assemblies within a section perpendicular to the axis of the joint are suppressed to ensure the smooth rolling of the rollers.

Moreover, the above-mentioned tilt suppressing means may include the outer peripheries of the trunnions, inclined so as to spread out toward the trunnion bottoms in their longitudinal sections. According to this configuration, even when the axes of the trunnions tilt with respect to the axes of the roller assembly within the section perpendicular to the axis of the joint, the tilts of the outer peripheries of the trunnions in themselves are suppressed or cancelled out. This reduces the above-described inward components. As a result, the tilts of the roller assemblies within the section perpendicular to the axis of the joint are suppressed to ensure the smooth rolling of the rollers.

Any of the specific configurations of the tilt suppressing means described above may be employed by itself. Two or more configurations may be used in combination.

In the configurations described above, a plurality of rolling elements may be interposed between the support rings and the rollers so as to make the support rings and the rollers capable of relative rotations. The rolling elements may be needle rollers, balls, and the like.

According to this invention, the tilts of the roller assemblies resulting from the inward components of loads applied to the contact portions between the trunnions and the roller assemblies are suppressed to achieve more effective reduction and stabilization of the induced thrust and slide resistance in a joint. This makes it possible to provide a tripod type constant velocity universal joint of yet lower vibration.

The nature, principle, and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 3(A)-3(C) show a second embodiment of the present invention, FIG. 3(A) being a partially-sectioned end view, FIG. 3 (B) a sectional view perpendicular to a trunnion in FIG. 3(A), FIG. 3(C) a longitudinal sectional view with an operating angle;

FIG. 4 is an enlarged sectional view of a support ring in FIGS. 3(A)-3(C);

FIGS. 16(A)-16(C) show a tripod type constant velocity universal joint according to a fifth embodiment of the present invention, FIG. 16(A) being a partially-sectioned end view, FIG. 16(B) a sectional view perpendicular to a trunnion in FIG. 16(A), FIG. 16(C) a sectional view of a support ring for explaining a contacting ellipse;

FIGS. 18 (A)-18(C) show a tripod type constant velocity universal joint according to a ninth embodiment of the present invention, FIG. 18(A) being a partially-sectioned end view, FIG. 18(B) a sectional view perpendicular to a trunnion in FIG. 18(A), FIG. 18(C) a longitudinal sectional view of the joint with an operating angle;

DETAILED DESCRIPTION OF THE PREFERRED EMBODIMENTS

Hereinafter, embodiments of the present invention will be described.

Figure 1B:
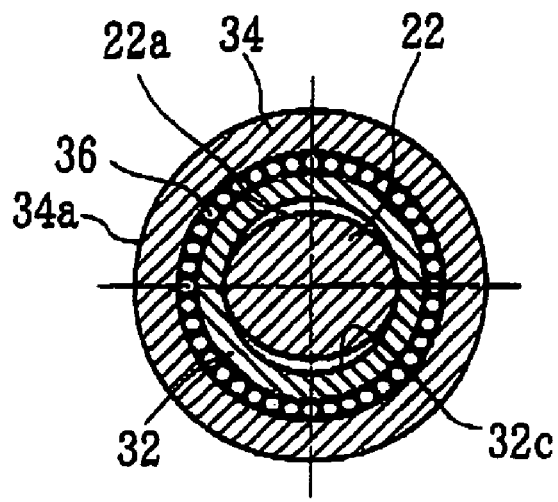
FIGS. 1(A)-1(C) show a first embodiment of the present invention, FIG. 1(A) being a partially-sectioned end view, FIG. 1(B) a sectional view perpendicular to a trunnion in FIG. 1(A), FIG. 1(C) a sectional view of a support ring for explaining a contacting ellipse.
Figure 1C:
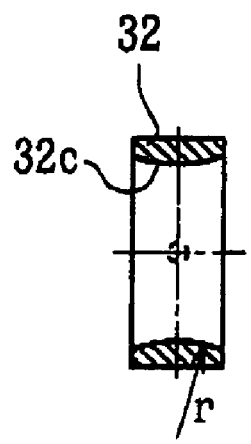
Figure 1A:
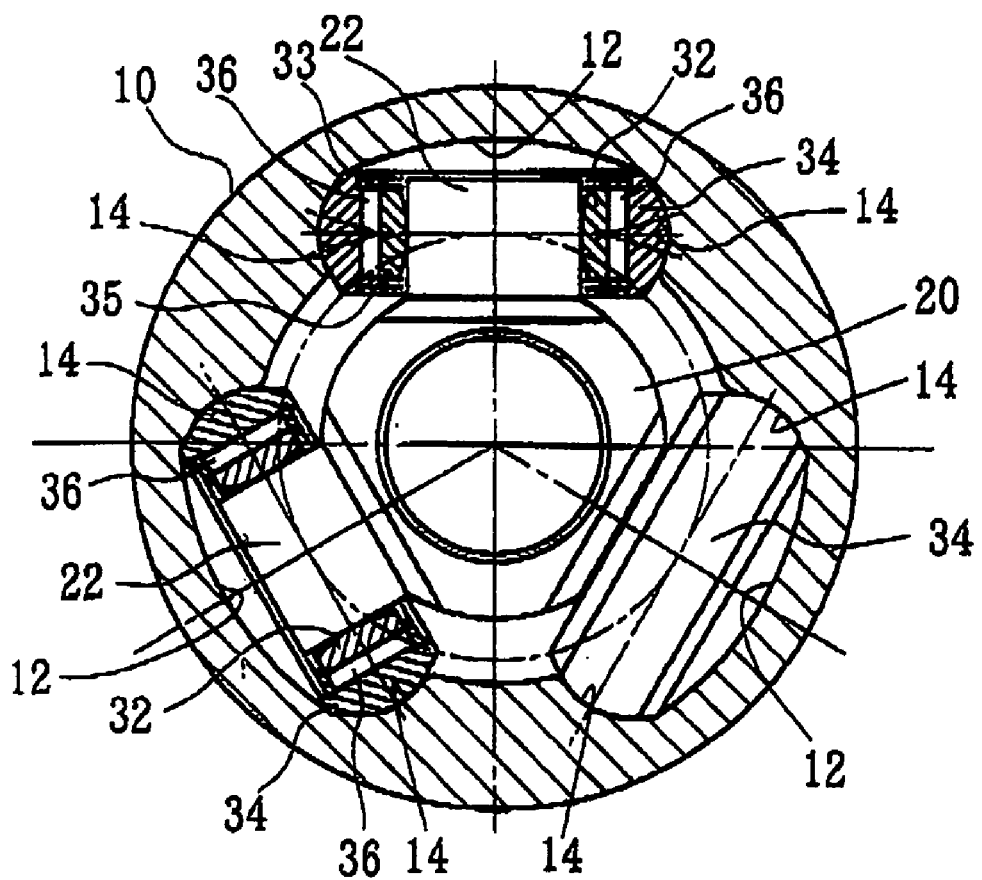

FIGS. 1(A) through 2(B) show a first embodiment of the present invention. FIG. 1(A) shows a cross section of the joint, FIG. 1(B) a section perpendicular to a trunnion, and FIG. 1(C) a section of a support ring. FIG. 2(A) shows a longitudinal section of the joint at an operating angle (.).

As shown in FIGS. 1(A)-1(C), the constant velocity universal joint is chiefly composed of an outer joint member 10 and a tripod member 20. One of two shafts to be coupled is connected to the outer joint member 10, and the other is to the tripod member 20.

The outer joint member 10 has three track grooves 12 axially extending in its inner periphery. Each of the track grooves 12 has roller guideways 14 formed on its circumferentially-opposed side walls. The tripod member 20 has three trunnions 22 which are projected radially. Each of the trunnions 22 carries a roller 34, and this roller 34 is accommodated in one of the track grooves 12 in the outer joint member 10. The outer peripheries 34a of the rollers 34 are convex surfaces conformable to the roller guideways 14.

Here, the outer peripheries 34a of the rollers 34 form convex surfaces whose generators are arcs having the centers of curvature radially off the axes of the trunnions 22. The roller guideways 14 have a section of Gothic-arch shape. Thus, the rollers 34 and the roller guideways 14 make angular contact with each other. In FIG. 1(A), dot-dash lines show pairs of contact positions. Spherical outer peripheries of the rollers may be combined with tapered cross sections of the roller guideways 14 to achieve angular contact therebetween. The adoption of such constitutions as provide angular contact between the outer peripheries 34a of the rollers 34 and the roller guideways 14 makes the rollers less prone to vibrate, thereby stabilizing the orientation of the rollers. Incidentally, when the angular contact is not employed, the roller guideways 14 may be constituted, for example, by part of a cylindrical surface whose axis is parallel to that of the outer joint member 10. In this case, the cross-sectional shapes of the guideways 14 are arcs corresponding to the generator to the outer peripheries 34a of the rollers 34.

Support rings 32 are fitted onto the outer peripheries 22a of the trunnions 22. These support rings 32 and the rollers 34 are assembled (unitized) via a plurality of needle rollers 36 to constitute roller assemblies capable of relative rotations. More specifically, the needle rollers 36 are rotatably interposed between inner and outer raceway surfaces, with the cylindrical outer peripheries of the support rings 32 and the cylindrical inner peripheries of the rollers 34 as the inner and outer raceway surfaces, respectively. As shown in FIG. 1(B), the needle rollers 36 are loaded in as many as possible without any retainer, or in a so-called full complement state. The reference numerals 33 and 35 represent pairs of washers which are fitted to annular grooves formed in the inner peripheries of the rollers 34, with an aim to stop the needle rollers 36 from coming off.

In a longitudinal section {FIG. 1(A)}, the outer peripheries 22a of the trunnions 22 have a straight shape parallel to the axes of the trunnions 22. In a cross section {FIG. 1(B)}, the outer peripheries have the shape of an ellipse whose major axis is perpendicular to the axis of the joint. The cross sections of the trunnions are generally elliptic, with a reduction in thickness as seen in the axial direction of the tripod member 20. In other words, each trunnion has such a cross-sectional shape that the faces opposed to each other in the axial direction of the tripod member retreat toward each other, i.e., to smaller diameters than the diameter of the imaginary cylindrical surface.

The inner peripheries 32c of the support rings 32 have an arcuate and convex section. That is, the generator to the inner peripheries 32c is a convex arc having a radius of r {FIG. 1(C)}. This combines with the above-described general elliptic cross sections of the trunnions 22 and the provision of predetermined clearances between the trunnions 22 and the support rings 32, to make the support rings 32 movable along the axial directions of the trunnions 22 as well as capable of tilting movements with respect to the trunnions 22. Besides, as described above, the support rings 32 and the rollers 34 are assembled (unitized) via the needle rollers 36 so as to be capable of relative rotations. Therefore, the support rings 32 and rollers 34 are capable of unitary tilting movements with respect to the trunnions 22. Here, the term "tilting movements" refers to the tilts the axes of the support rings 32 and rollers 34 make with respect to the axes of the trunnions 22, within the planes containing the axes of the trunnions 22 {see FIG. 2(A)}.

In the embodiment shown in FIGS. 1(A)-1(C), the trunnions 22 have the generally elliptic cross sections, and the inner peripheries 32c of the support rings 32 have the arcuate convex cross sections. Thus, the contacting ellipses therebetween approach points as shown by the broken line in FIG. 1(C), with a reduction in area at the same time. As a result, the forces to tilt the roller assemblies (32, 34, 36) decrease greatly as compared to the conventional ones, whereby the rollers 34 further improve in orientation stability. This means a reduction of the induced thrust and of the slide resistance as well, accompanied with a narrowed range of variations of these values. Accordingly, in the constant velocity universal joint of this embodiment, the specifications of the induced thrust and slide resistance can be made smaller. Moreover, the joint can be accurately regulated within the specifications.

Figure 7:
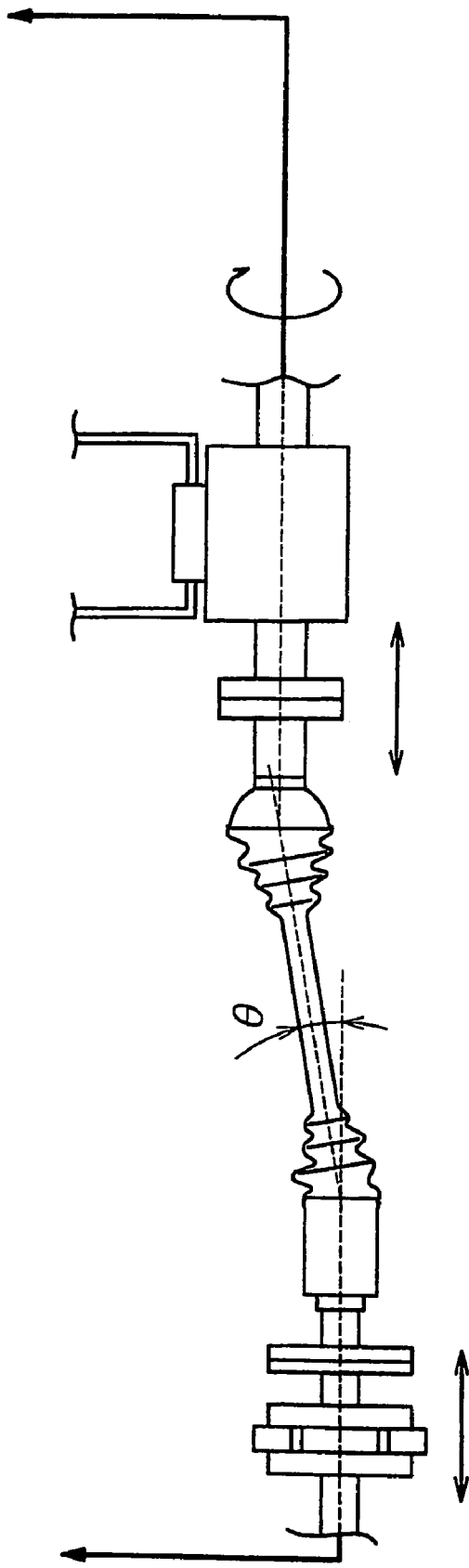
FIG. 7 is a conceptual diagram showing a part of the power recirculation type tester used for the measurement of the induced thrust and slide resistance.
Figure 8:
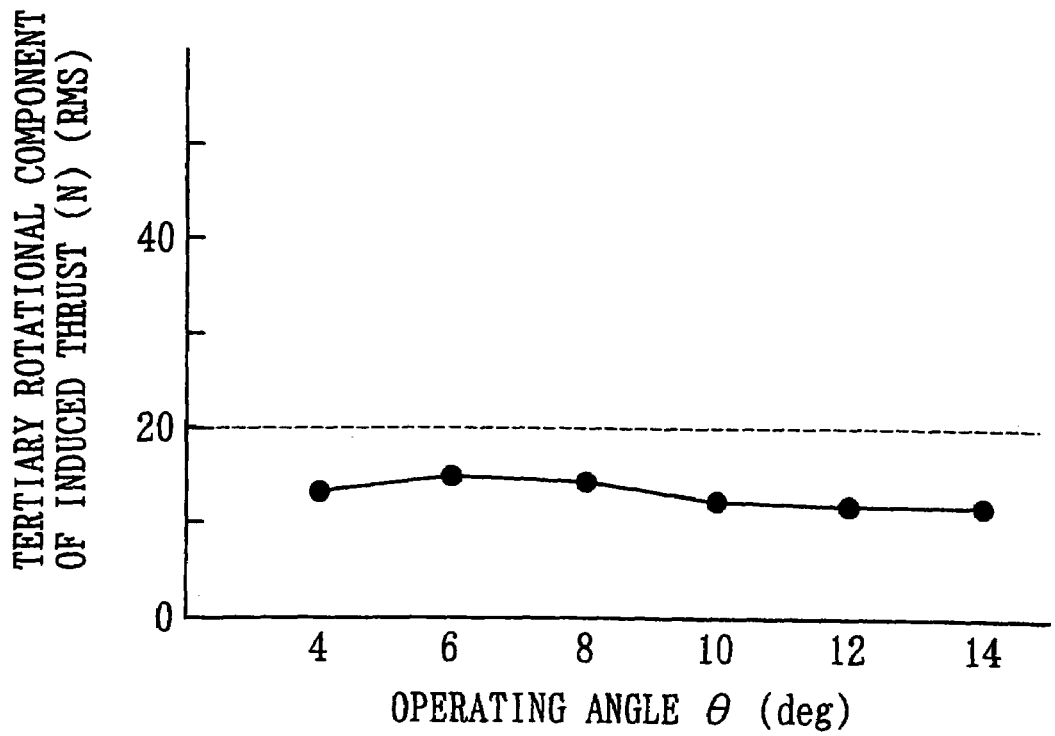
FIG. 8 is a chart showing the measurements of the induced thrust in the constant velocity universal joint of FIGS. 1(A)-1(C)

In this embodiment, the tertiary rotational component of the induced thrust under the condition (X1) {the number of revolutions R=100-500 (rpm), the operating angle .=0-14 (deg), and the load torque T=0.1×Ts (N·m)} is regulated to or below 20 N (RMS). This provides the constant velocity universal joint of this embodiment with a reduced and stabilized induced thrust, along with excellent low-vibration characteristics and high reliability. FIG. 8 shows the measurements of the induced thrust (tertiary rotational component) in the constant velocity universal joint of this embodiment, obtained by a tester to be described later (FIG. 7).

While in this embodiment the tertiary rotational component of the induced thrust in this embodiment is regulated to or below 20 N (RMS) under the condition (X1), it has only to be regulated to or below 30 N (RMS). Under the condition (X2) {the number of revolutions R=100-500 (rpm), the operating angle .=0-14 (deg), and the load torque T=0.2×Ts (N·m)}, the tertiary rotational component may be regulated to 55 N or less (RMS), and preferably 35 N or less (RMS). Under the condition (X3) {the number of revolutions R=100-500 (rpm), the operating angle .=0-14 (deg), and the load torque T=0.3×Ts (N·m)}, it may be regulated to 80 N or less (RMS), and preferably 55 N or less (RMS). In addition, the regulations under the conditions (X1), (X2), and (X3) may be effected to overlap one another. Any one of these conditions may be used for regulation.

Figure 9:
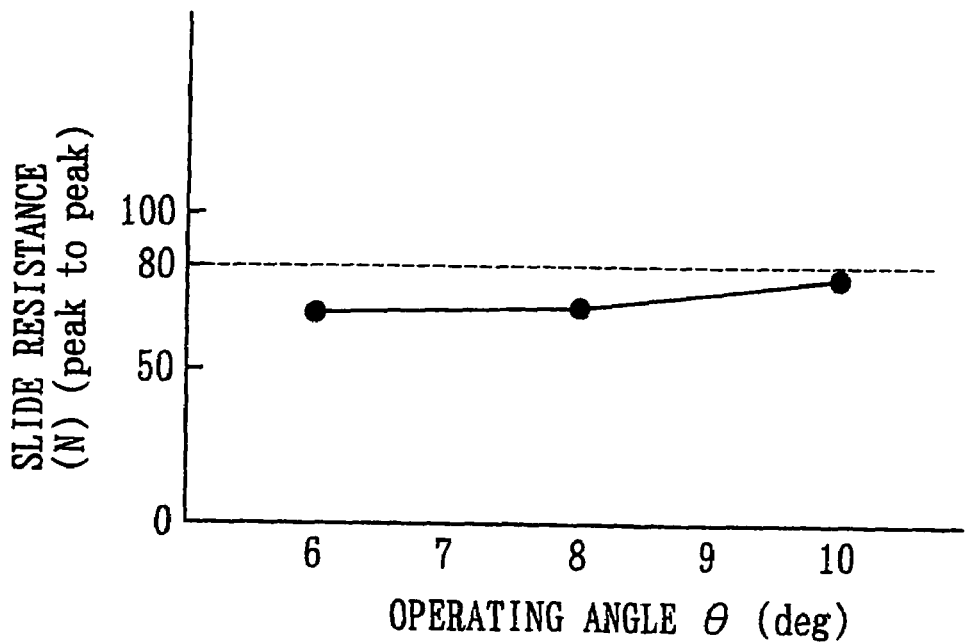
FIG. 9 is a chart showing the measurements of the slide resistance in the constant velocity universal joint of FIGS. 1(A)-1(C)

Moreover, in this embodiment, the slide resistance under the condition (Y3) {the number of revolutions R=0 (rpm), the operating angle .=0-10 (deg), the load torque T=98-196 (N·m), the vibrating frequency f=15-40 (Hz), and the vibrating amplitude=±0.10 to ±0.25 (mm)} is regulated to or below 80 N (peak to peak), aside from the induced thrust regulation described above. This provides the constant velocity universal joint of this embodiment with reduced, stabilized induced thrust and slide resistance, along with excellent low-vibration characteristics and high reliability. FIG. 9 shows the measurements of the slide resistance in the constant velocity universal joint of this embodiment, obtained by the tester to be described later (FIG. 7).

Note that the slide resistance may be regulated to 40 N or less (peak to peak) under the condition (Y1) {the number of revolutions R=0 (rpm), the operating angle .=0-10 (deg), the load torque T=98-196 (N·m), the vibrating frequency f=15-40 (Hz), and the vibrating amplitude=±0.01 to ±0.03 (mm)}. It may be regulated to 60 N or less (peak to peak) under the condition (Y2) {the number of revolutions R=0 (rpm), the operating angle .=0-10 (deg), the load torque T=98-196 (N·m), the vibrating frequency f=15-40 (Hz), and the vibrating amplitude=±0.05 to ±0.08 (mm)}. Here, an appropriate condition is selected from among the above-mentioned three conditions based on the vibrating amplitude with reference to the amplitude of external vibrations input to the constant velocity universal joint, such as idling vibrations. In some cases, a value other than those in the above-mentioned three conditions can be used for the vibrating amplitude. Furthermore, even though both the induced thrust and the slide resistance are regulated in this embodiment, either one of these may be regulated alone.

The regulations of the induced thrust and the slide resistance can be effected, for example, through 100% control. Alternatively, the regulations can be effected by sampling a predetermined number of products out of finished product lots at a predetermined frequency, measuring the samples for induced thrust and slide resistance, and controlling the lots to which the samples belong to based on the measurements.

FIG. 7 shows a part of the power recirculation type tester to be used for the measurement of the induced thrust and slide resistance. In the diagram, the tripod type constant velocity universal joint of the above-described embodiment is placed on the A side (hereinafter, referred to as "A-side joint"). A pairing constant velocity universal joint of fixed type (for example, a Rzeppa type constant velocity universal joint) is arranged on the B side (hereinafter, referred to as "B-side joint"). The tripod member of the A-side joint and the inner joint member of the B-side joint are coupled to each other via an intermediate shaft. A predetermined operating angle is given to both the joints. In addition, the outer joint member of the A-side joint is connected to a load cell. The outer joint member of the B-side joint is connected to a hydraulic servo.

For induced thrust measurement, a load torque T with a predetermined number of revolutions R and magnitude is input to the B-side joint. This load torque T is transferred from the B-side joint through the intermediate shaft to the A-side joint, whereby the A-side joint rotates at the same number of revolutions as the input number of revolutions. Here, an induced thrust occurs in the A-side joint. This induced thrust is detected by the load cell through the outer joint member of the A-side joint. Incidentally, the hydraulic servo is not actuated in measuring the induced thrust.

The induced thrust is measured, for example, at a predetermined number of rotations R (=100-500 rpm) and load torque T (=0.1×Ts N·m, 0.2×Ts N·m, 0.3×Ts N·m) while changing the operating angle . to 4, 6, 8, 10, 12, and 14 deg, for five minutes on each operating angle. Then, the measurement data under each measurement condition is subjected to frequency analysis. The tertiary rotational components obtained are used for induced thrust regulation and control.

Meanwhile, for slide resistance measurement, the rotation of the tester is stopped. Then, the B-side joint and the A-side joint are put under a predetermined torque T while the hydraulic servo is activated to input an axial vibrating force having a predetermined amplitude to the B-side joint. This axial vibrating force is transferred from the B-side joint through the intermediate shaft to the tripod member of the A-side joint, and further transmitted to the outer joint member of the A-side joint by means of the internal slide resistance. As a result, the outer joint member of the A-side joint vibrates with the slide resistance as the vibratory force. This vibratory force (slide resistance) is detected by the load cell.

The slide resistance is measured, for example, at a predetermined load torque T (=98-196 N·m), vibrating frequency f (=15-40 Hz), and vibrating amplitude (±0.01 to ±0.03 mm, ±0.05 to ±0.08 mm, ±0.10 to ±0.25 mm) while changing the operating angle . to 6, 8, and 10, for 1-5 minute(s) on each operating angle. Then, the absolute values of the positive and negative peak values in the measurement data (waveform) under each measurement condition are totaled (peak to peak). The values obtained are used for slide resistance regulation and control.

In addition to the regulations and controls by the sampling and measurements described above, there may be provided means for individually regulating and controlling the dimensions and shapes of parts that are associated with the induced thrust and/or slide resistance (e.g., for individually regulating the outer peripheries of the trunnions of the tripod member, the contact surfaces of the rollers, the contact surfaces of the support rings, the contact surfaces of the needle rollers, the roller guideways of the outer joint member, and so forth in dimension and shape). Moreover, means for individually regulating and controlling the factors contributing to the rotational stability of the rollers in the roller assemblies (e.g., for individually regulating the radial and axial clearances between parts, the surface properties of the contact surfaces, the lubrication conditions, and so forth) may also be provided.

Figure 2A:
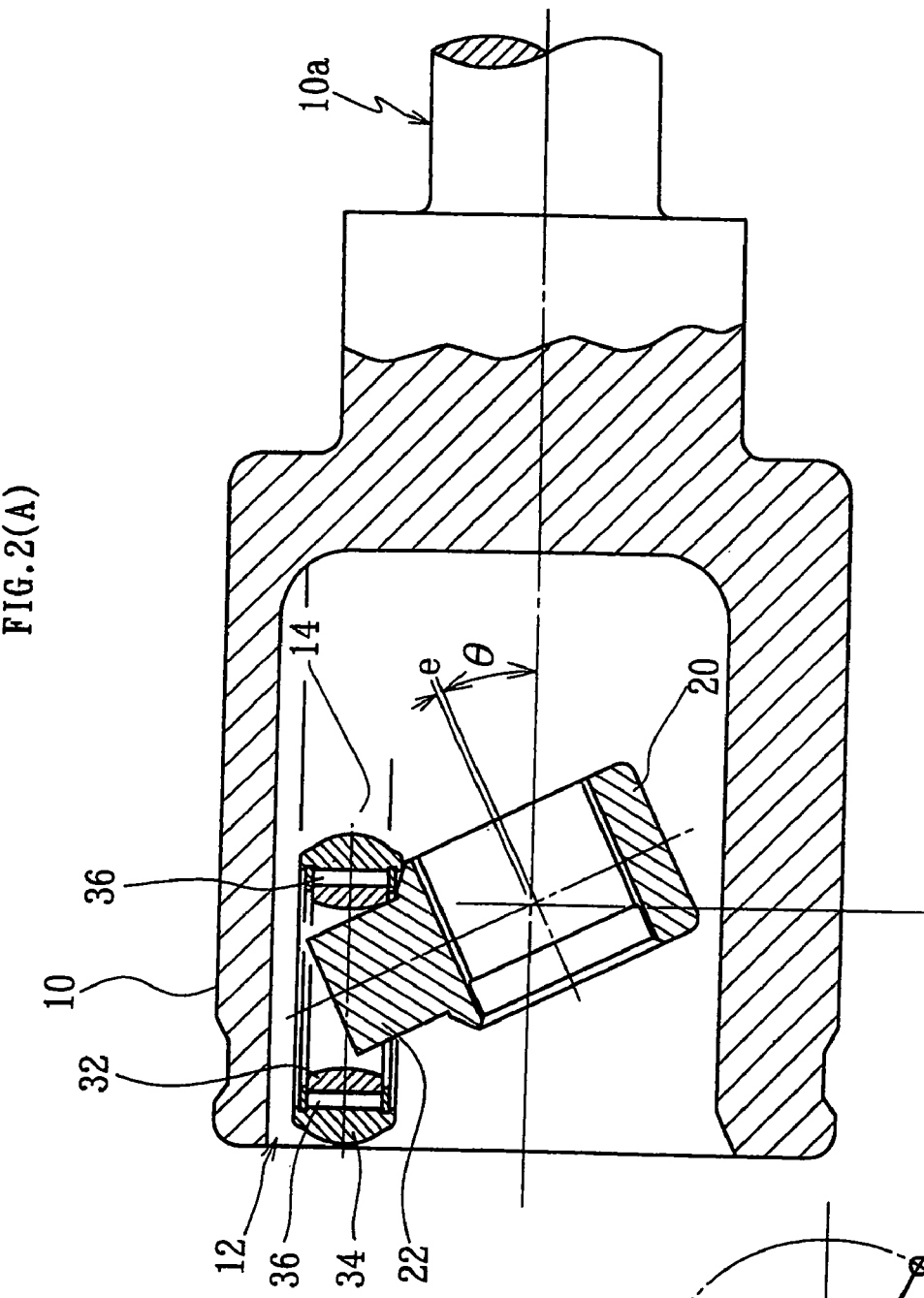
FIG. 2(A) is a longitudinal sectional view showing the constant velocity universal joint of FIGS. 1(A)-1(C) with an operating angle.
Figure 2B:
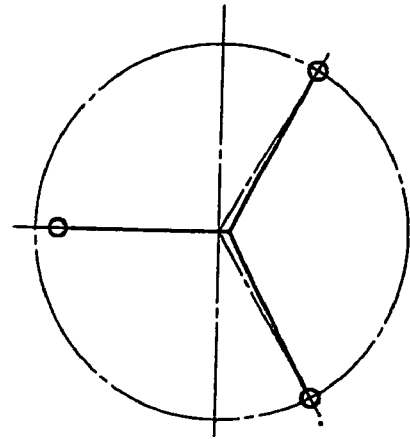
FIG. 2(B) is a schematic side view of the tripod member in FIG. 2(A)

FIGS. 3(A) through 4 show a second embodiment of the present invention. This second embodiment differs from the above-described first embodiment only in that the generator to the inner peripheries 32c of the support rings 32, which has been a single arc in the first embodiment, consists of a combination of an arc portion 32a at the center and relief portions 32b on both sides. The role of the relief portions 32b is to avoid the interference with the trunnions 22 at an operating angle (.) as shown in FIG. 3(C). Each relief portion 32b is formed by a straight or curved line that gradually spreads out from an edge of the arc portion 32a to an end of the support ring 32. The relief portions 32b illustrated here are formed by part of a conical surface having a vertex angle .=50°. The arc portions 32a have a large radius of curvature (r) on the order of e.g. 30 mm, so as to allow the trunnions 20 to tilt 2-3° or so with respect to the support rings 32. In tripod type constant velocity universal joints, one rotation of the outer joint member 10 constitutionally produces three nutations of the tripod member 20 about the center of the outer joint member 10. Here, the amount of eccentricity represented by the symbol e {FIG. 2(A)} increases in proportion to the operating angle (.). While the three trunnions 22 are spaced by 120° from one another, the presence of the operating angle (.) causes the trunnions 22 to tilt as shown in FIG. 2(B). More specifically, with reference to the vertical trunnion 22 shown to the upper in the diagram, the remaining two trunnions 22 are declined slightly from their zero-operating-angle axes shown by the dot-dash lines. For example, an operating angle (.) of approximately 23° causes a decline of the order of 2-30. This decline can be readily allowed by the curvature of the arc portions 32a on the inner peripheries 32c of the support rings 32. Therefore, the surface pressures at the contact portions between the trunnions 22 and the support rings 32 can be prevented from becoming excessively high. Incidentally, FIG. 2(B) is a schematic representation of the three trunnions 22 of the tripod member 20 as seen from the left side of FIG. 2(A), the full lines showing the individual trunnions. Moreover, in this second embodiment, the track grooves 12 in the outer joint member 10 are provided with no collars. The significant reduction of the roller-assembly-tilting forces as described above allows the omission of the collars in the track grooves 12.

This second embodiment is identical to the first embodiment in that the tertiary rotational component of the induced thrust is regulated to or below 20 N (RMS) under the condition (X1) and the slide resistance is regulated to or below 80 N (peak to peak) under the condition (Y3). Incidentally, since the measurements showed the similar tendencies as those in the first embodiment, description thereof will be omitted here. Besides, the regulation conditions for the induced thrust and slide resistance, and the effects thereof are in conformity with those of the first embodiment described above. Thus, repetitive description thereof will be omitted.

Figure 5A:
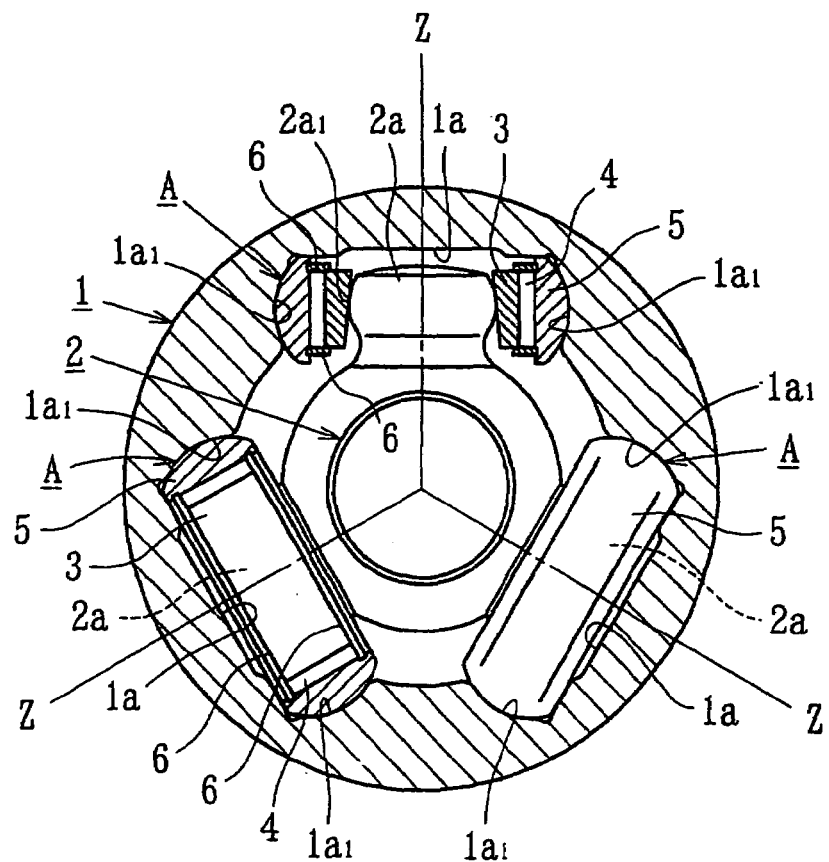
FIGS. 5(A) and 5(B) show a third embodiment of the present invention, FIG. 5(A) being a partially-sectioned end view, FIG. 5(B) an enlarged cross-sectional view of the essential parts in FIG. 5(A)
Figure 5B:
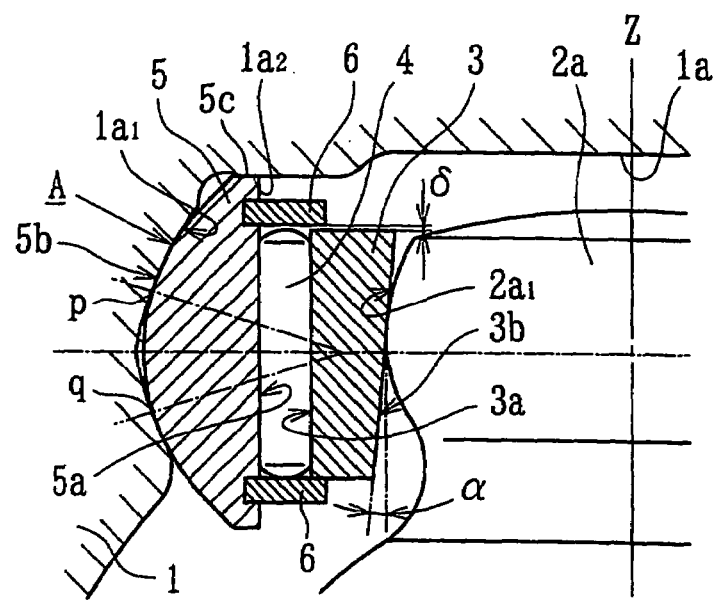
Figure 6:
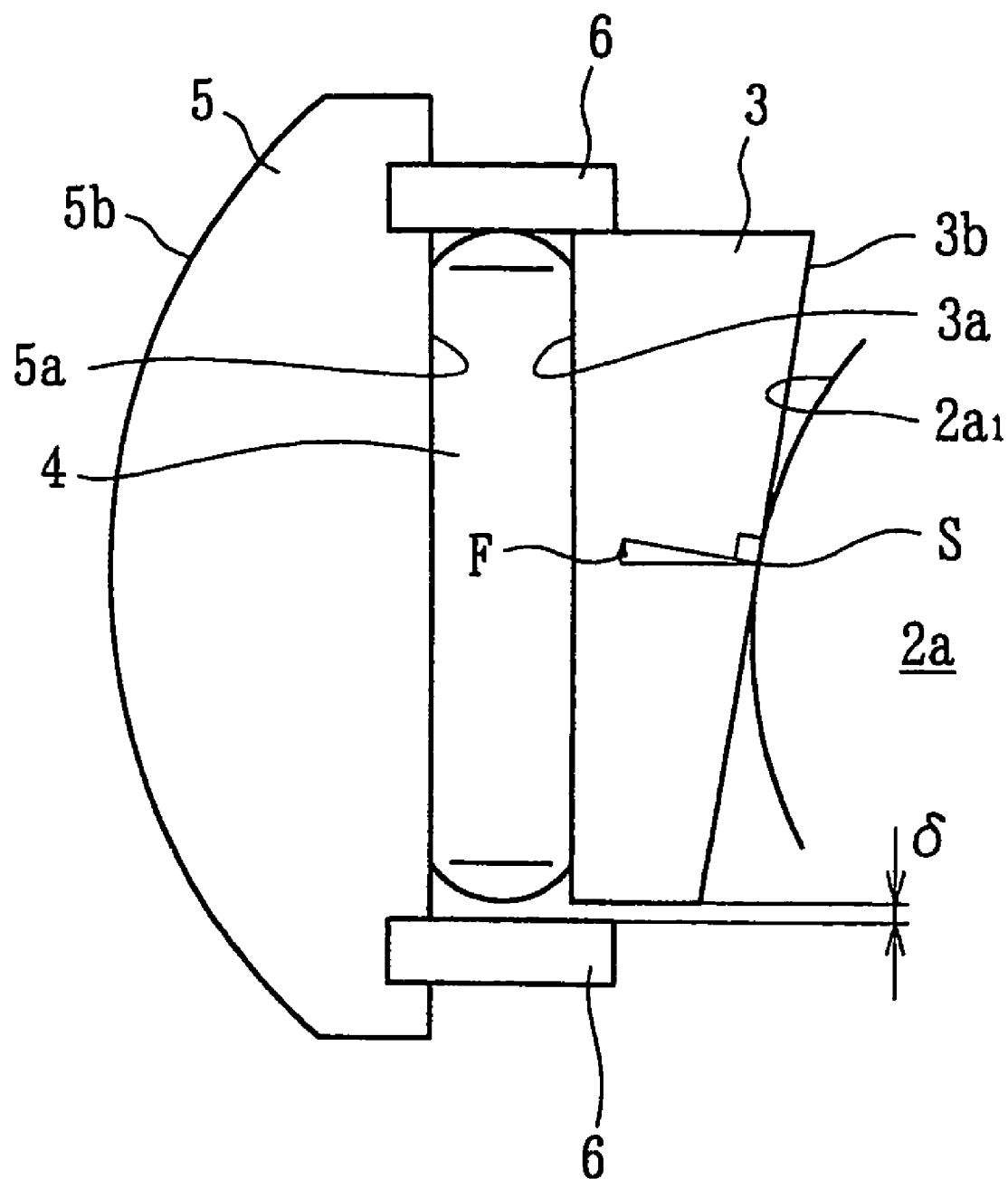
FIG. 6 is a diagram for explaining a load component F occurring at a contact position between a support ring and a trunnion in FIGS. 5(A) and 5(B)

FIGS. 5(A) through 6 show a third embodiment of the present invention. Here, FIGS. 5(A) and 5(B) show the joint at an operating angle of 0°, under no rotational torque.

The tripod type constant velocity universal joint in this embodiment includes an outer joint member 1 to be connected to one of two shafts to be coupled, and a tripod member 2 to be connected to the other.

The outer joint member 1 is generally cup-like in appearance, and has an inner periphery provided with three axially-extending track grooves 1a at circumferential regular positions. Each of the track grooves 1a has roller guideways 1a1 on both sides.

The tripod member 2 has three radially-projecting trunnions 2a at circumferential regular positions. Each of the trunnions 2a has a convex-arcuate outer periphery 2a1. Onto the outer periphery 2a1 is mounted a roller assembly A, or an assembly of a support ring 3, a plurality of needle rollers 4, and a roller 5.

As magnified in FIG. 5(B), each roller assembly A includes the plurality of needle rollers 4 rotatably interposed between a cylindrical outer periphery 3a of the support ring 3 and a cylindrical inner periphery 5a of the roller 5. A pair of snap rings 6 fitted to the inner periphery 5a of the roller 5 lock the support ring 3 and the needle rollers 4 at both ends so as to restrain axial movements of the support ring 3 and the needle rollers 4 with respect to the roller 5 (movements along the axis Z of the trunnion 2a). The end faces of the support ring 3 and the end faces of the needle rollers 4 have axial clearances . from the pair of snap rings 6. In the diagram, the axial clearances . are rather exaggerated in dimension. Moreover, the axial clearances between the end faces of the support ring 3 and the snap rings 6 and the axial clearances between the end faces of the needle rollers 4 and the snap rings 6 can be designed in identical values or in different values. In the diagrams, both the clearances are shown as an axial clearances . without distinction. Furthermore, the outer periphery 3a of the support ring 3 and the inner periphery 5a of the roller 5 have slight radial clearances from the rolling contact surfaces of the needle rollers 4.

The inner peripheries 3b of the support rings 3 are fitted to the spherical outer peripheries 2a1 of the trunnions 2a. In this embodiment, the inner peripheries 3b of the support rings 3 have the form of a cone gradually contracting in diameter toward the extremities of the trunnions 2a. The inner peripheries 3b make line contact with the outer peripheries 2a1 of the trunnions 2a. This permits tilting movements of the roller assemblies A with respect to the trunnions 2a. The inner peripheries 3b of the support rings 3 have an inclination . as small as e.g. 0.1-3°, and preferably 0.1-1°. The present embodiment employs the setting of .=0.5°. In the diagrams, the inclinations of the inner peripheries 3b are rather exaggerated.

The generator to the outer peripheries 5b of the rollers 5 are arcs whose centers are outwardly off the centers of the trunnions 2a.

In the present embodiment, the roller guideways 1a1 in the outer joint member 1 have a section of double-arc shape (Gothic-arch shape). Therefore, the roller guideways 1a1 and the outer periphery 5b of each roller 5 make angular contact at two points p and q. The angular contact points p and q are opposed to each other in the direction of the axis Z of the trunnion 2a, at equal distances from the center line that passes through the center of the outer periphery 5b of the roller 5 and intersects the axis Z at right angles. Incidentally, the roller guideways 1a1 may have a section of V-shape, parabola shape, or the like. Moreover, in this embodiment, shoulder surfaces 1a2 are arranged in the track grooves 1a next to the roller guideways 1a1, so that the end faces 5c of the rollers 5 on the trunnion-extremity sides are guided by these shoulder surfaces 1a2.

Since the inner peripheries 3b of the support rings 3 are shaped like a cone that gradually contracts in diameter toward the trunnion extremity, the application of rotational torque to this joint produces load components F as shown in FIG. 6 (where the inclination of the inner periphery 3b is exaggerated more than in FIGS. 5(A) and 5(B)). More specifically, load components F directed to the trunnion extremities occur at the contact positions S between the inner peripheries 3b of the support rings 3 and the outer peripheries 2a1 of the trunnions 2a. These load components F act to push up the support rings 3 and the needle rollers 4 toward the trunnion extremities, so that the support rings 3 and the needle rollers 4 are pressed against the snap rings 6 on the trunnion-extremity sides. This stabilizes the contact positions S between the inner peripheries 3b of the support rings 3 and the outer peripheries 2a1 of the trunnions 2a. Besides, the load components F also act to push up the rollers 5 toward the trunnion extremities via the support rings 3 and the needle rollers 4, thereby stabilizing the orientation of the rollers 5 with respect to the roller guideways 1a1. Such stabilization of the contact positions S and the orientation stabilization of the rollers 5 combine with each other to reduce the induced thrust and the slide resistance, as well as to narrow the range of variations of these values. Accordingly, in the constant velocity universal joint of this embodiment, the specifications of the induced thrust and slide resistance can be made smaller. Moreover, the joint can be accurately regulated within the specifications. Incidentally, the inner peripheries 3b of the support rings 3 may have a cylindrical shape.

The regulations of the induced thrust and slide resistance, and the effects therefrom are in conformity with those of the first embodiment described above. Thus, repetitive description thereof will be omitted.

Note that the present invention in association with the regulations of the induced thrust and slide resistance is not limited to the constant velocity universal joints having the configurations described above, and may be applied to constant velocity universal joints of other configurations.

Figure 10:
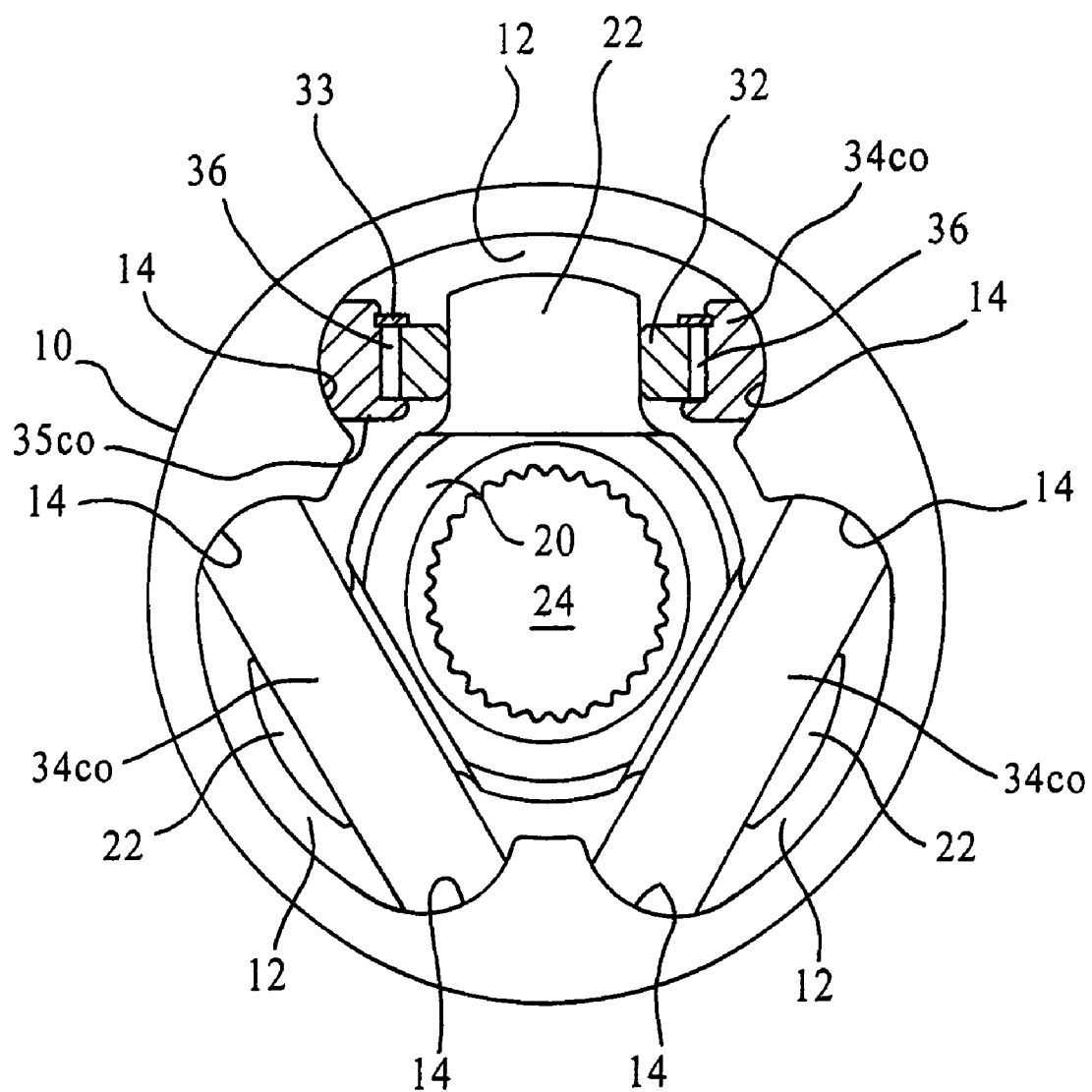
FIG. 10 is a partially-sectioned end view of a constant velocity universal joint according to a fourth embodiment of the present invention.
Figure 11A:
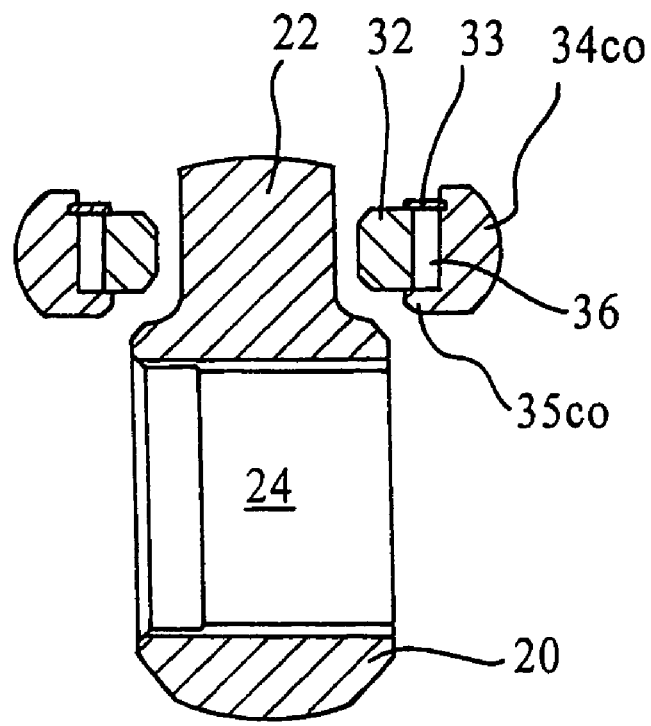
FIG. 11(A) is a longitudinal sectional view of the tripod member and a roller assembly in the constant velocity universal joint of FIG. 10.
Figure 11B:
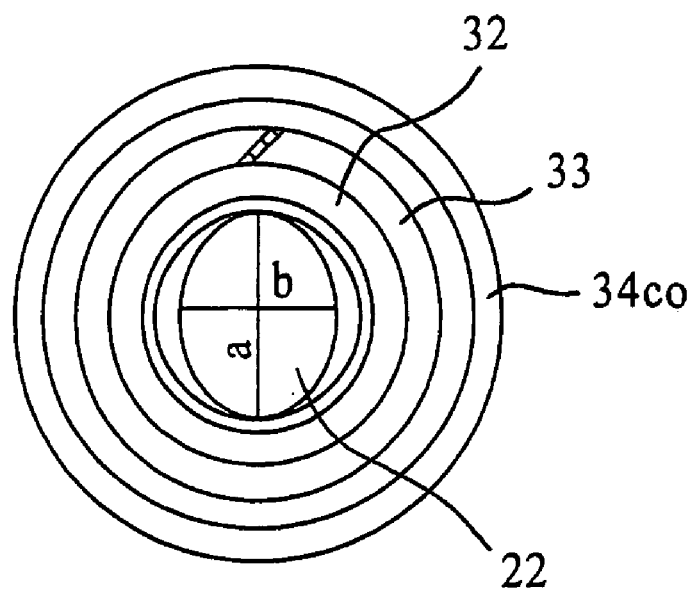
FIG. 11(B) is a plan view of the tripod member and the roller assembly shown in FIG. 11(A)
Figure 12:
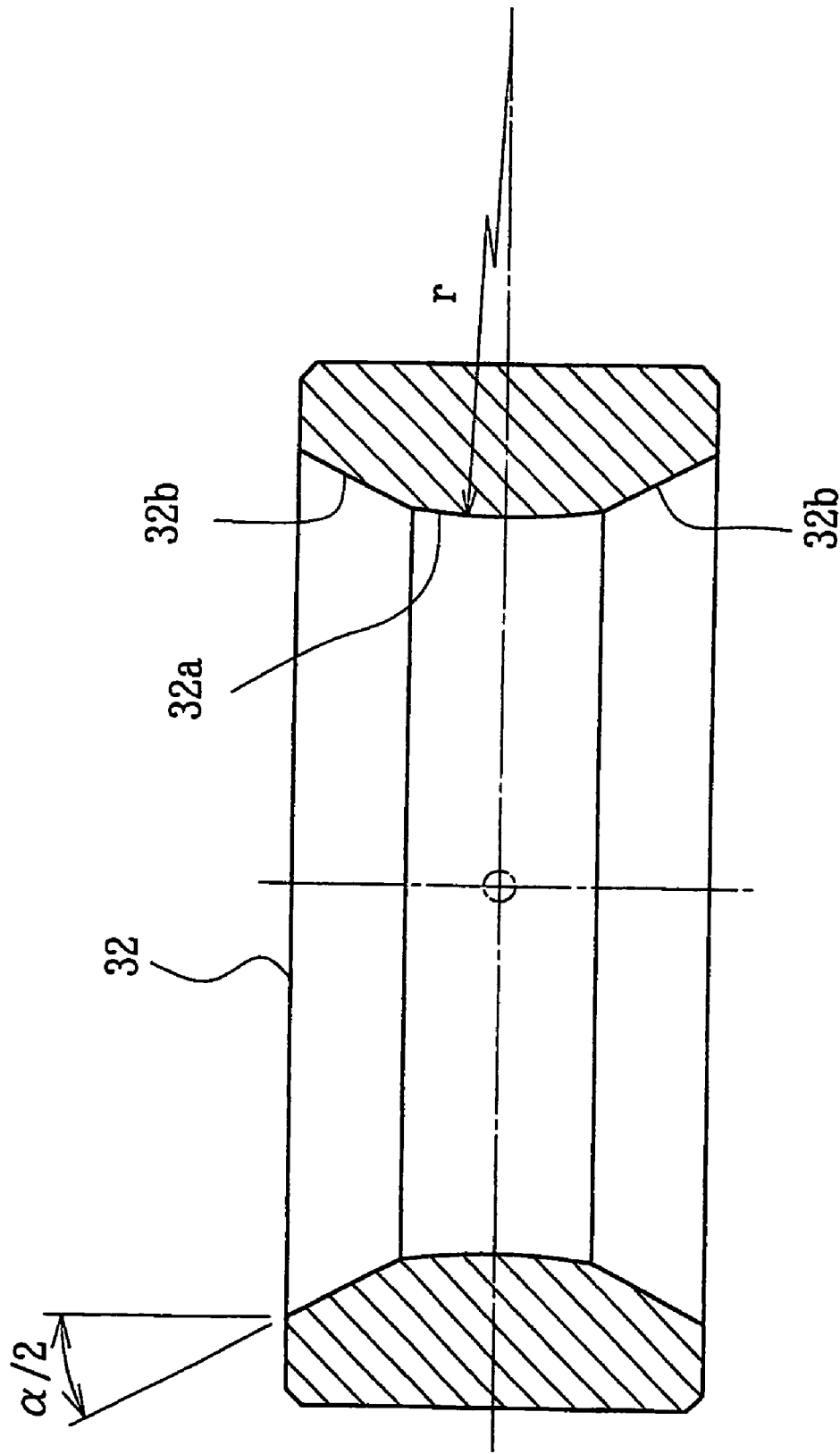
FIG. 12 is an enlarged sectional view of a ring in the constant velocity universal joint of FIG. 10.
Figure 13A:
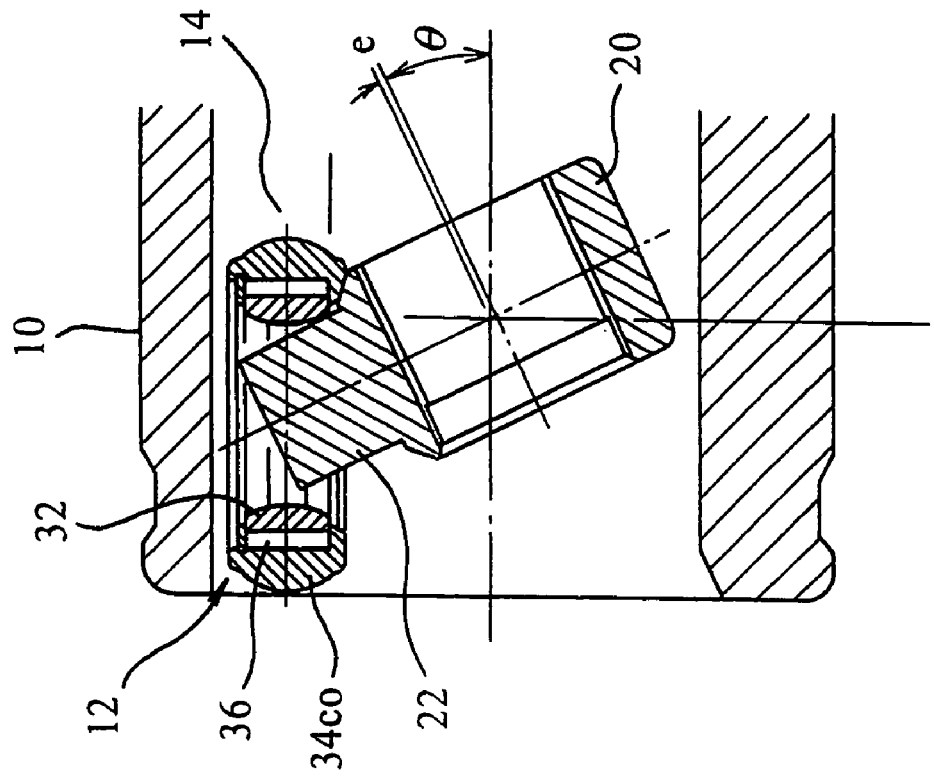
FIG. 13(A) is a longitudinal sectional view showing the constant velocity universal joint of FIG. 10 with an operating angle.

Next, a fourth embodiment of the present invention will be described with reference to FIGS. 10 through 13(B). Here, FIG. 10 is a partially-sectioned end view of a constant velocity universal joint. FIG. 11(A) is a longitudinal sectional view of a tripod member and a roller assembly in the constant velocity universal joint shown in FIG. 10. FIG. 11(B) is a plan view of FIG. 11(A). FIG. 12 is an enlarged sectional view of a ring. FIG. 13(A) is a longitudinal sectional view of the constant velocity universal joint at an operating angle.

As shown in FIG. 10, the constant velocity universal joint includes an outer joint member 10 and a tripod member 20. One of two shafts to be coupled is connected to the outer joint member 10, and the other is to the tripod member 20.

The outer joint member 10 has three track grooves 12 axially extending in its inner periphery. Each of the track grooves 12 has roller guideways 14 formed on its circumferentially-opposed side walls. The tripod member 20 has three trunnions 22 which are projected radially. Each of the trunnions 22 carries a roller 34co, and this roller 34co is accommodated in one of the track grooves 12 in the outer joint member 10. The outer peripheries of the rollers 34co are convex surfaces conforming to the roller guideways 14. The tripod member 20 has a spline hole (or serration hole) 24 for accepting a spline shaft portion (or serration shaft portion) of the shaft to be coupled.

The outer periphery of each roller 34co forms a convex surface whose generator is an arc having the center of curvature radially off the axis of the trunnion 22. The roller guideways 14 have a section of Gothic-arch shape. Thus, the rollers 34co and the roller guideways 14 make angular contact with each other. Spherical outer peripheries of the rollers may be combined with tapered cross sections of the roller guideways 14 to achieve angular contact therebetween. The adoption of such constitutions as provide angular contact between the outer peripheries 34a of the rollers 34co and the roller guideways 14 makes the rollers 34co less prone to vibrate, thereby stabilizing the orientation of the rollers. Incidentally, when the angular contact is not employed, the roller guideways 14 may be constituted, for example, by part of a cylindrical surface whose axis is parallel to that of the outer joint member 10. In this case, the cross-sectional shapes of the guideways 14 are arcs corresponding to the generator to the outer peripheries of the rollers 34co.

Rings 32 are fitted onto the outer peripheries of the trunnions 22. These rings 32 and the rollers 34co are assembled (unitized) via a plurality of needle rollers 36 to constitute roller assemblies capable of relative rotations. More specifically, the needle rollers 36 are rotatably interposed between inner and outer raceway surfaces, with the cylindrical outer peripheries of the rings 32 and the cylindrical inner peripheries of the rollers 34co as the inner and outer raceway surfaces, respectively. The needle rollers 36 are loaded in as many as possible without any retainer, or in a so-called full complement state. In this embodiment, collars 35co for receiving the end faces of the needle rollers 36 are formed on one ends of the rollers 34co. The reference numeral 33 represents washers which are fitted to annular grooves formed in the inner peripheries of the rollers 34co, with an aim to stop the needle rollers 36 from coming off. These washers 33 have a cut across their circumferences {see FIG. 11 (B)}, so as to be fitted to the annular grooves in the inner peripheries of the rollers 34co as elastically contracted in diameter. Incidentally, the collars 35co may be eliminated so that both ends of the needle rollers 34co are retained by pairs of washers 33.

In this embodiment, the outer peripheries 22a of the trunnions 22, as seen in a longitudinal section {see FIG. 11(A)}, have a straight shape parallel to the axes of the trunnions 22. In a cross section {FIG. 11(B)}, the outer peripheries have the shape of an ellipse whose major axis is perpendicular to the axis of the constant velocity universal joint. In FIG. 11(B), the symbols a and b represent the major radius and the minor radius, respectively. The cross sections of the trunnions 22 are generally elliptic, with a reduction in thickness as seen in the axial direction of the tripod member 20. In other words, each trunnion has such a cross-sectional shape that the faces opposed to each other in the axial direction of the tripod member retreat toward each other, i.e., to smaller diameters than the diameter of the imaginary cylindrical surface.

As shown in FIG. 12, the generator to the inner peripheries of the rings 32 consists of a combination of an arc portion 32a at the center and relief portions 32b on both sides. The role of the relief portions 32b is to avoid the interference with the trunnions 22 at an operating angle as shown in FIG. 13(A). Each relief portion 32b is formed by a straight or curved line that gradually spreads out from an edge of the arc portion 32a to an end of the ring 32. The relief portions 32b illustrated here are formed by part of a conical surface having a vertex angle =50°. The arc portions 32a have a large radius of curvature on the order of e.g. 30 mm, so as to allow the trunnions 20 to tilt 2-3° or so with respect to the rings 32. Here, instead of being provided with the relief portions 32b as in this embodiment, the inner peripheries of the rings 32 may be formed into arcuate convex sections along their entire lengths. In either case, the above-described general elliptic cross sections of the trunnions 22 and the provision of predetermined clearances between the trunnions 22 and the rings 32 combine with each other to make the rings 32 movable along the axial directions of the trunnions 22 as well as capable of tilting movements with respect to the trunnions 22. Besides, as described above, the rings 32 and the rollers 34co are unitized via the needle rollers 36 so as to be capable of relative rotations. Therefore, the rings 32 and rollers 34co are capable of unitary tilting movements with respect to the trunnions 22. Here, the term "tilting movements" refers to the tilts the axes of the rings 32 and rollers 34co make with respect to the axes of the trunnions 22, within the planes containing the axes of the trunnions 22 {see FIG. 13(a)}.

In the case of a conventional joint, the trunnions make contact with the inner peripheries of the rings at the full lengths of their outer peripheries. This produces circumferentially extended contacting ellipses. Therefore, when the trunnions tilt with respect to the outer joint member, there arise friction moments which function to tilt the rings, and finally the rollers, with the movement of the trunnions. On the other hand, in the embodiment shown in FIG. 10, the trunnions 22 have the generally elliptic cross sections and the inner peripheries of the rings 32 have the spherical cross sections. Thus, the contacting ellipses therebetween approach points as shown by the broken line in FIG. 12, with a reduction in area at the same time. As a result, the forces to tilt the roller assemblies (32, 34co, 36) decrease greatly as compared to the conventional ones, whereby the rollers 34co further improve in orientation stability. Moreover, in a conventional joint, the trunnions and the rings come to contact with each other at the width centers of the rings when the operating angle =0. When the joint transfers torque with some operating angle, however, the trunnions oscillate axially, shifting the contacts between the trunnions and the rings to the lower than the width centers of the rings. This leads to unstable behavior of the needle rollers, sometimes hampering their stable rolling. In the embodiment shown in FIG. 10, on the contrary, the with respect to the axes of the trunnions 22, within the planes containing the axes of the trunnions 22 {see FIG. 13(A)}. contacts between the trunnions and the inner peripheries of the rings always stay at the width centers of the rings 32. Thus, the needle rollers 36 roll with stability.

Figure 13B:
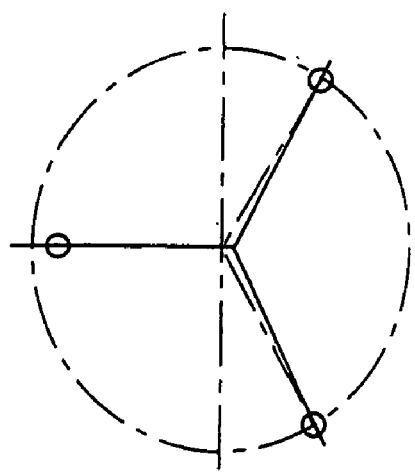
FIG. 13(B) is a schematic side view of the tripod member in FIG. 13(A)

In tripod type constant velocity universal joints, one rotation of the outer joint member 10 constitutionally produces three nutations of the tripod member 20 about the center of the outer joint member 10. Here, the amount of eccentricity of the trunnion center about the center of the outer joint member 10, represented by the symbol e {FIG. 13(A)}, increases in proportion to the operating angle .. While the three trunnions 22 are spaced by 120° from one another, the presence of the operating angle . causes the trunnions 22 to tilt as shown in FIG. 13(B). More specifically, with reference to the vertical trunnion 22 shown to the upper in the diagram, the remaining two trunnions 22 are declined slightly from their axes at the operating angle .=0, shown by the dot-dash lines. For example, an operating angle . of approximately 23° causes a decline of the order of 2-3°. This decline can be readily allowed by the curvature of the arc portions 32a on the inner peripheries of the rings 32. Therefore, the surface pressures at the contact portions between the trunnions 22 and the rings 32 can be prevented from becoming excessively high. Incidentally, FIG. 13(B) is a schematic representation of the three trunnions 22 of the tripod member 20 as seen from the left side of FIG. 13(A), the full lines showing the individual trunnions. Moreover, clearances for absorbing the tilts of the trunnions 22 resulting from such nutations of the trunnion center, which is peculiar to tripod type constant velocity universal joints, are provided between the major axes 2a of the trunnions 22 and the inner diameters of the rings 32.

Conventional joints have collars for restraining roller tilts. These collars are formed on the bottom sides of the track grooves, i.e., on the sides of greater diameter as seen in the cross section of the outer joint member, so as to be opposed to the end faces of the rollers. The constant velocity universal joints according to the present invention may also have such collars. Nevertheless, in the embodiments described above, the factors to tilt the rollers 34co are removed, or suppressed as much as possible. Accordingly, such collars in the track grooves 12 are not always required, and thus are omitted. This eliminates the fear that the rollers 34co might come into contact with the collars to produce sliding frictions when they are temporarily swung by some reason.

Figure 14B:
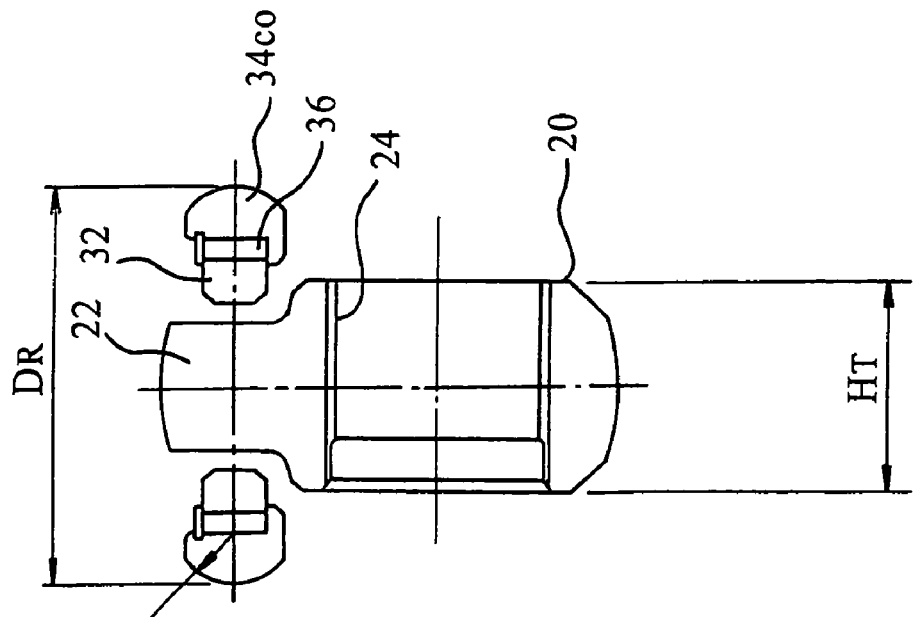
FIGS. 14(A) and 14(B) show the dimensions of the individual parts of the constant velocity universal joint in FIG. 10, FIG. 14(A) being a partially-sectioned end view, FIG. 14(B) a longitudinal sectional view of the tripod member and a roller assembly.
Figure 14A:
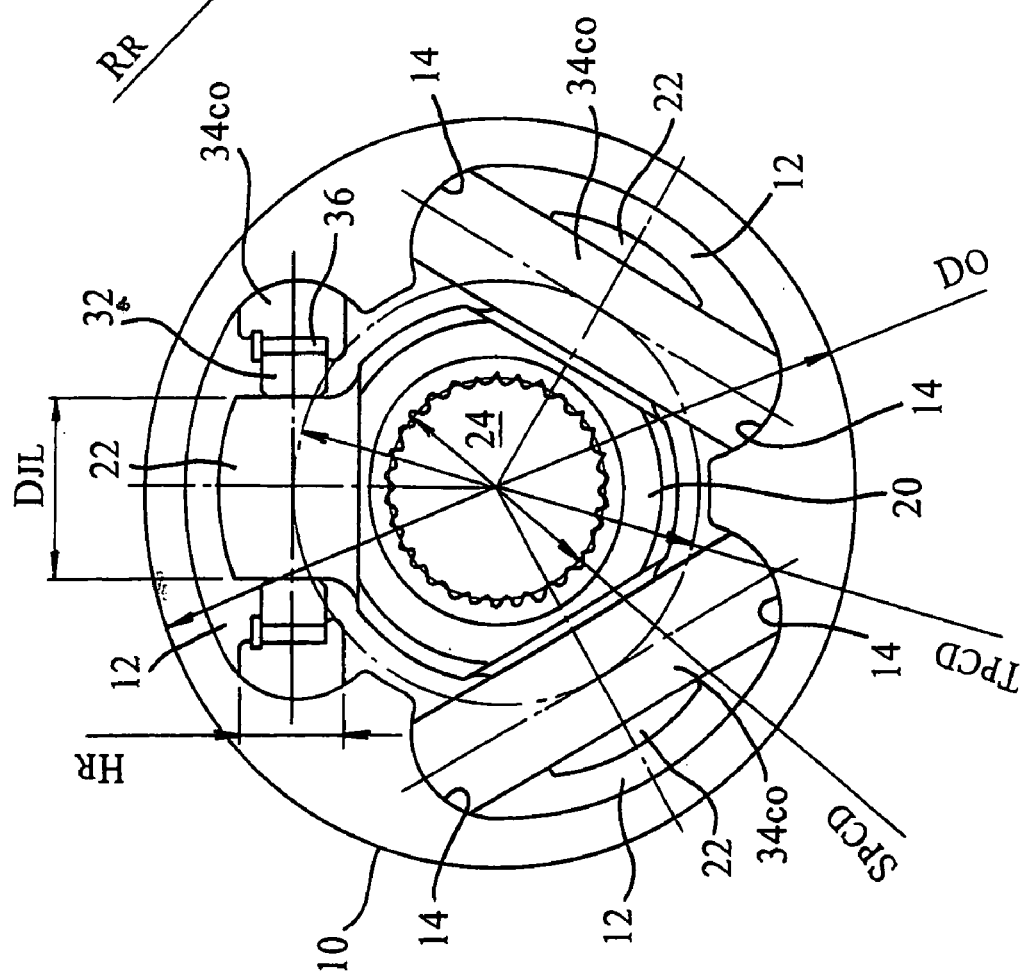

Now, the dimensional proportion of the individual parts of the constant velocity universal joint according to the embodiment shown in FIG. 10 will be described with reference to FIGS. 14(A) and 14(B). The following provides the description of the individual symbols in the diagrams.

$S_{PCD}$: the pitch circle diameter of the spline hole 24 in the tripod member 20, $H_T$: the barrel width of the tripod member 20, $D_{JL}$: the major diameter of a trunnion 22, $D_O$: the outer diameter of the outer joint member 10, $T_{PCD}$: the pitch circle diameter of the track grooves 12, $D_R$: the outer diameter of a roller 34co, $H_R$: the width of a roller 34co, and $R_R$: the radius of curvature of the outer periphery of a roller 34co.

The pitch circle diameter $T_{PCD}$ of the track grooves 12 in the outer joint member 10 is set so that its ratio to the pitch circle diameter $S_{PCD}$ of the spline hole 24 in the tripod member 20, or $T_{PCD}/S_{PCD}$, falls within the range of 1.7-2.1, or preferably 1.72-2.10. The reason for this is that if the track grooves 12 are made so small in pitch circle diameter $T_{PCD}$ that the ratio $T_{PCD}/S_{PCD}$ falls below 1.72, there arises a problem of interference between the rollers 34co and the shoulders of the trunnions 22. Besides, the surface pressures at the contact portions, such as between the trunnions 22 and the rings 32, increase to cause a drop in durability. On the other hand, if the track grooves 12 are made so large in pitch circle diameter $T_{PCD}$ that the ratio $T_{PCD}/S_{PCD}$ exceeds 2.10, the outer joint member 10 increases in outer diameter $D_O$ with a deterioration in vehicle mountability. In addition, if the outer diameter $D_O$ of the outer joint member 10 is given, there remains little space for the roller assemblies (32, 34co, 36).

In order to verify the durability mentioned above, durability tests were conducted on constant velocity universal joints with $T_{PCD}/S_{PCD}$ set at the values shown in the top row of Table 1. The results are shown in the middle row of Table 1. The mark . indicates that the target time was satisfied. The mark . indicates that the target time was not satisfied. The following shows the test conditions.

Torque: 686 Nm,
Number of revolutions: 250 rpm,
Operating angle: 10 deg, and
Operating hours: 300 hrs.

As shown in the middle row of Table 1, it is confirmed that the joint of 1.6 in $T_{PCD}/S_{PCD}$ could not satisfy the target time while those of 1.7 or higher in $T_{PCD}/S_{PCD}$ satisfied the target time, with sufficient durability.

Moreover, with $T_{PCD}/S_{PCD}$ set at the individual values described above, the outer joint members 10 were checked for a need of an increase in outer diameter. The results are shown in the bottom row of Table 1. While the outer joint members of 2.1 or lower in $T_{PCD}/S_{PCD}$ were in no need of an increase in outer diameter, that of 2.2 in $T_{PCD}/S_{PCD}$ needed an increase in outer diameter.

Figure 15:
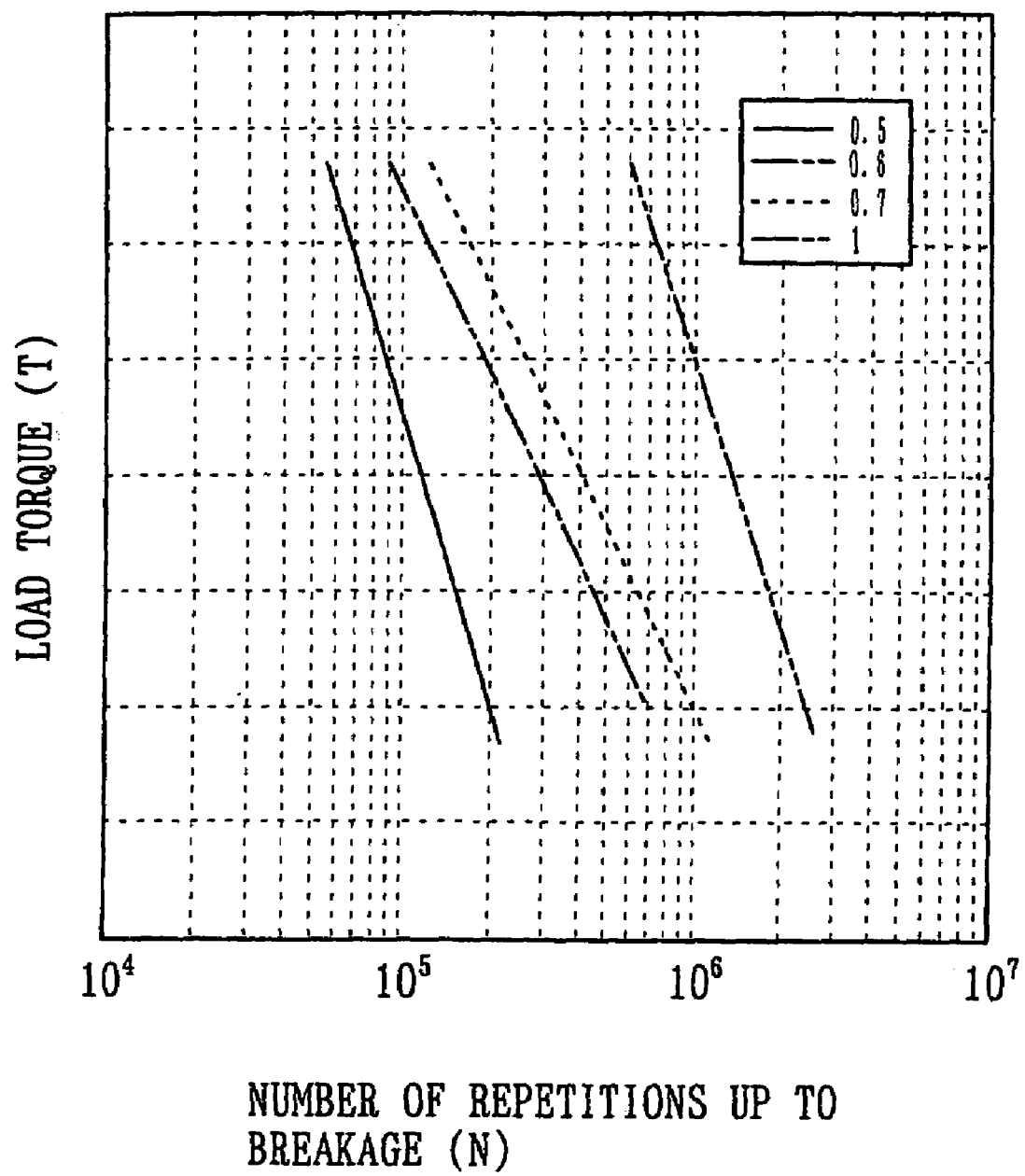
FIG. 15 is a graph showing the results of pulsating torsion fatigue strength tests.

The major diameter $D_{JL}$ of a trunnion 22 is set so that its ratio to the pitch circle diameter $S_{PCD}$ of the spline hole 24, or $D_{JL}/S_{PCD}$, falls within the range of 0.6-1.0, or preferably 0.63-0.94. The reason for this is that if the trunnions are made so small in major diameter $D_{JL}$ that the ratio $D_{JL}/S_{PCD}$ falls below 0.6, the constant velocity universal joint cannot function satisfactory. On the other hand, if the trunnions are made so large in major diameter that the ratio $D_{JL}/S_{PCD}$ exceeds 1.0, there remains little space for the roller assemblies to be arranged in, which is dissatisfactory in terms of the limit in the outer diameter. Here, pulsating torsion fatigue strength tests were conducted on four types of test joints which were the constant velocity universal joints according to the embodiment of FIG. 10, with the major diameter $D_{JL}$ of the trunnions 22 changed to set the ratio $D_{JL}/S_{PCD}$ to the pitch circle diameter of the spline hole 24 was set at "0.5," "0.6," "0.7," and "1," respectively. FIG. 15 shows the test results. The abscissa represents the number of repetitions up to breakage (N), and the ordinate the load torque (T). The dot-dashed "0.6" line is in close agreement with the target T-N chart. Thus, the ratio of "0.5" a precludes satisfactory joint functions. On the other hand, the ratios above "1.0" eliminates the space for the roller assemblies to be arranged in, which is dissatisfactory in terms of the limit in the outer diameter.

The outer diameter $D_R$ of the rollers 34co is set so that its ratio to the pitch circle diameter $S_{PCD}$ of the spline hole 24, or $D_R/S_{PCD}$, falls within the range of 1.4-2.3, or preferably 1.47-2.21. If the rollers 34co are made so small in outer diameter $D_R$ that the ratio $D_R/S_{PCD}$ falls below 1.47, the surface pressures between the rollers 34co and the roller guideways 14 increase to drop the durability. Besides, the reduction in the thickness of the rollers 34co causes a problem of deteriorated strength. Meanwhile, when the rollers 34co are made so large in outer diameter $D_R$ that the ratio $D_R/S_{PCD}$ exceeds 2.21, the outer joint member 10 becomes thinner to drop in forgeability if the diameter $D_O$ of the outer joint member 10 is given. This also produces a problem of shaft interference, as well as advances interference of the outer joint member 10 with the cup bottoms, yielding an increased cup depth and a greater weight.

In order to verify the durability mentioned above, durability tests were conducted on constant velocity universal joints with $D_R/S_{PCD}$ set at the values shown in the top row of Table 2. The results are shown in the middle row of Table 2. The test conditions were identical to those for Table 1. Again, the mark . indicates that the target time was satisfied. The mark . indicates that the target time was not satisfied. Note that the portions to be evaluated in this case are the rollers/roller guideways.

As shown by the test results in the middle row, it is confirmed that the joint of 1.3 in $D_R/S_{PCD}$ could not satisfy the target time while those of 1.48 or higher in $D_R/S_{PCD}$ satisfied the target time, with sufficient durability.

Additionally, evaluations as to the forgeability of the outer joint members are shown in the bottom row of Table 2. More specifically, thinner portions of the outer joint members were checked for cracks. The outer joint member of 2.33 in $D_R/S_{PCD}$ produced some cracks, whereas those of 2.21 or lower in $D_R/S_{PCD}$ were free of cracks, with no sign of poor forgeability.

The outer diameter $D_O$ of the outer joint member 10 is set so that its ratio to the pitch circle diameter $S_{PCD}$ of the spline hole 24, or $D_O/S_{PCD}$, falls within the range of 2.78-3.77. If the outer joint member 10 is made so small in outer diameter $D_O$ that the ratio $D_O/S_{PCD}$ falls below 2.78, the surface pressures at the individual contact portions increase to lower the durability. In addition, the stresses on the individual parts increase to cause deterioration in strength. On the other hand, increasing the outer diameter $D_O$ of the outer joint member 10 to such an extent that the ratio $D_O/S_{PCD}$ exceeds 3.77 not only deteriorates the vehicle mountability but also yield a weight increase.

The barrel width $H_T$ of the tripod member 20 is set so that its ratio to the pitch circle diameter $S_{PCD}$ of the spline hole 24, or $H_T/S_{PCD}$, falls within the range of 0.81-1.22. If the tripod member 20 is made so small in barrel width $H_T$ that the ratio $H_T/S_{PCD}$ falls below 0.81, the length of the spline fit decreases to lower the spline strength. On the other hand, if the tripod member 20 is made so large in barrel width $H_T$ that the ratio $H_T/S_{PCD}$ exceeds 1.22, there arises a problem of interference between the rollers 34co and the shoulders of the trunnions 22.

The width $H_R$ of the rollers 34co is set so that its ratio to the pitch circle diameter $S_{PCD}$ of the spline hole 24, or $H_R/S_{PCD}$, falls within the range of 0.38-0.67. If the rollers 34co are made so small in width $H_R$ that the ratio $H_R/S_{PCD}$ falls below 0.38, the surface pressures between the rollers 34co and the roller guideways 14 increase to drop the durability. Besides, the reduction in the rigidity of the rollers 34co results in insufficient strength. Meanwhile, when the rollers 34co are made so large in width $H_R$ that the ratio $H_R/S_{PCD}$ exceeds 0.67, the rollers 34co come into interference with the shoulders of the trunnions 22. Moreover, if the outer diameter $D_O$ of the outer joint member 10 is given, the outer joint member 10 becomes thinner to drop in forgeability.

The radius of curvature $R_R$ of the outer peripheries of the rollers 34co is set so that its ratio to the pitch circle diameter $S_{PCD}$ of the spline hole 24, or $R_R/S_{PCD}$, falls within the range of 0.19-1.11. If the, outer peripheries of the rollers 34co are made so small in the radius of curvature $R_R$ that the ratio $R_R/S_{PCD}$ falls below 0.19, the rollers 34co drop in rigidity into insufficient strength. Meanwhile, when the outer peripheries of the rollers 34co are made so large in the radius of curvature $R_R$ that the ratio $R_R/S_{PCD}$ exceeds 1.11, the outer joint member 10 becomes thinner to drop in forgeability if the diameter $D_O$ of the outer joint member 10 is given.

Figure 17A:
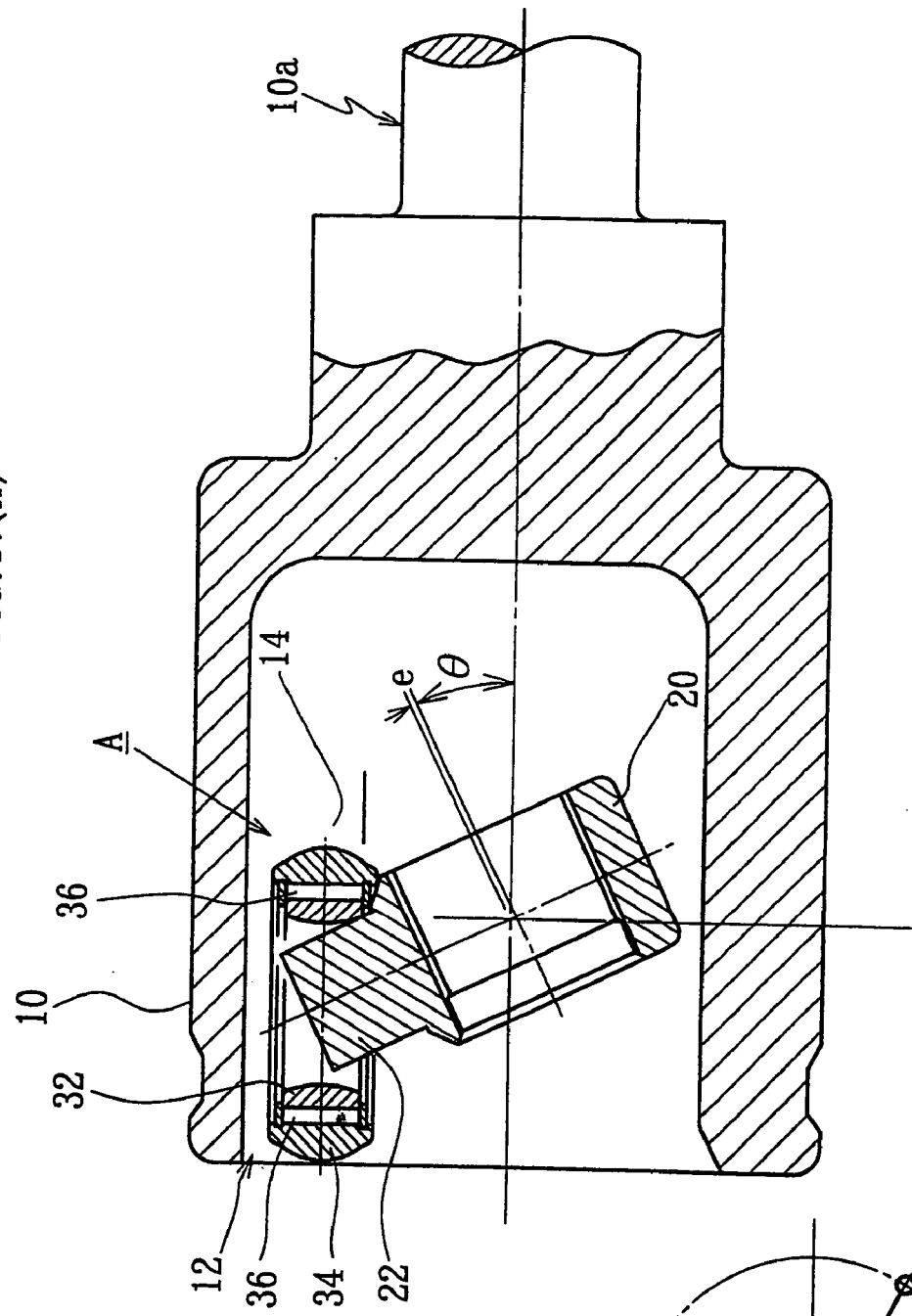
FIG. 17(A) is a longitudinal sectional view showing the constant velocity universal joint of FIGS. 16(A)-16(C) with an operating angle.
Figure 17B:
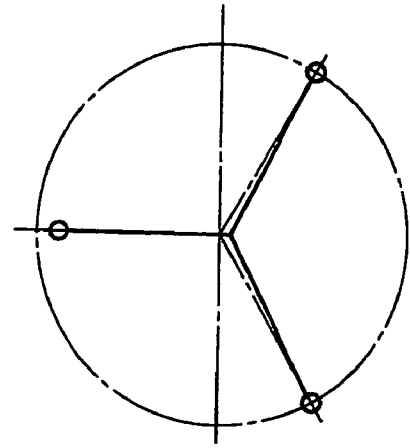
FIG. 17(B) is a schematic side view of the tripod member in FIG. 17(A)

FIGS. 16(A) through 17(B) show a tripod type constant velocity universal joint according to a fifth embodiment. FIG. 16(A) shows a section perpendicular to the axis of the joint. FIG. 16(B) shows a section perpendicular to the axis of a trunnion. FIG. 16(C) shows a section of a support ring. FIGS. 17(A) and 17(B) show the joint with an operating angle (.), in a section parallel to the axis of the joint.

As shown in FIG. 16(A), the constant velocity universal joint of this embodiment is chiefly composed of an outer joint member 10 and a tripod member 20. One of two shafts to be coupled is connected to a shaft portion 10a {see FIG. 17(A)} of the outer joint member 10, and the other is to the tripod member 20.

The outer joint member 10 has three track grooves 12 axially extending in its inner periphery. Each of the track grooves 12 has roller guideways 14 formed on its circumferentially-opposed side walls. The tripod member 20 has three trunnions 22 which are projected radially. Each of the trunnions 22 carries a roller 34, and this roller 34 is accommodated in one of the track grooves 12 in the outer joint member 10. The outer peripheries 34a of the rollers 34 are convex surfaces conformable to the roller guideways 14.

Here, the outer peripheries 34a of the rollers 34 have arcuate convex sections whose generators are arcs having the centers of curvature radially off the axes of the trunnions 22. The roller guideways 14 have a section of Gothic-arch shape. Thus, the rollers 34 and the roller guideways 14 make angular contact with each other. Incidentally, spherical outer peripheries of the rollers may be combined with tapered, parabolic, or other cross sections of the roller guideways 14 to achieve angular contact therebetween. The adoption of such constitutions as provide two angular contacts between the outer peripheries 34a of the rollers 34 and the roller guideways 14 stabilizes the orientation of the rollers. Incidentally, when the angular contact is not employed, the roller guideways 14 may be constituted, for example, by part of a cylindrical surface whose axis is parallel to that of the outer joint member 10. In this case, the cross-sectional shapes of the guideways 14 are arcs corresponding to the generator to the outer peripheries 34a of the rollers 34.

A support ring 32 is fitted onto the outer periphery 22a of each trunnion 22. These support rings 32 and the rollers 34 are assembled (unitized) via a plurality of needle rollers 36 to constitute roller assemblies (roller assemblies) A capable of relative rotations.

Figure 20:
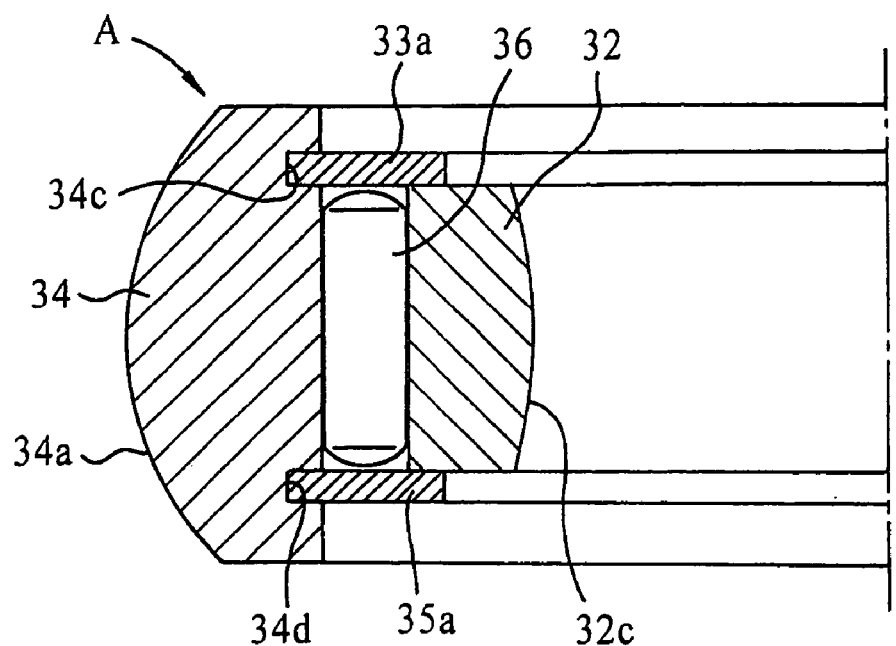
FIG. 20 is an enlarged partial sectional view of a roller assembly in FIGS. 16(A)-17(B)

More specifically, as magnified in FIG. 20, a plurality of needle rollers 36 are rotatably interposed between inner and outer raceway surfaces, with the cylindrical outer peripheries of the support rings 32 and the cylindrical inner peripheries of the rollers 34 as the inner and outer raceway surfaces, respectively. Then, lock means are arranged on both axial sides of each roller assembly A so as to restrain axial relative movements of the support rings 32, the rollers 34, and the needle rollers 36. In the example shown in the diagram, the lock means on both sides consist of the lock rings 33 and 35, which are fitted to circumferential grooves 34c and 34d formed in the bore ends of the roller 34, respectively. There are slight axial clearances in between the lock rings 33, 35 and the support ring 32, and in between the lock rings 33, 35 and the needle rollers 36. The lock rings 33 and 35 thus attached to the rollers 34 make contact with the end faces of the support rings 32 and the end faces of the needle rollers 36, thereby restraining these members from axial relative movements with respect to the rollers 34. Here, an example of the lock rings 33 and 35 is a split ring partially split by a slit. As shown in FIG. 16(B), the needle rollers 36 are loaded in as many as possible without any retainer, or in a so-called full complement state.

Figure 21:
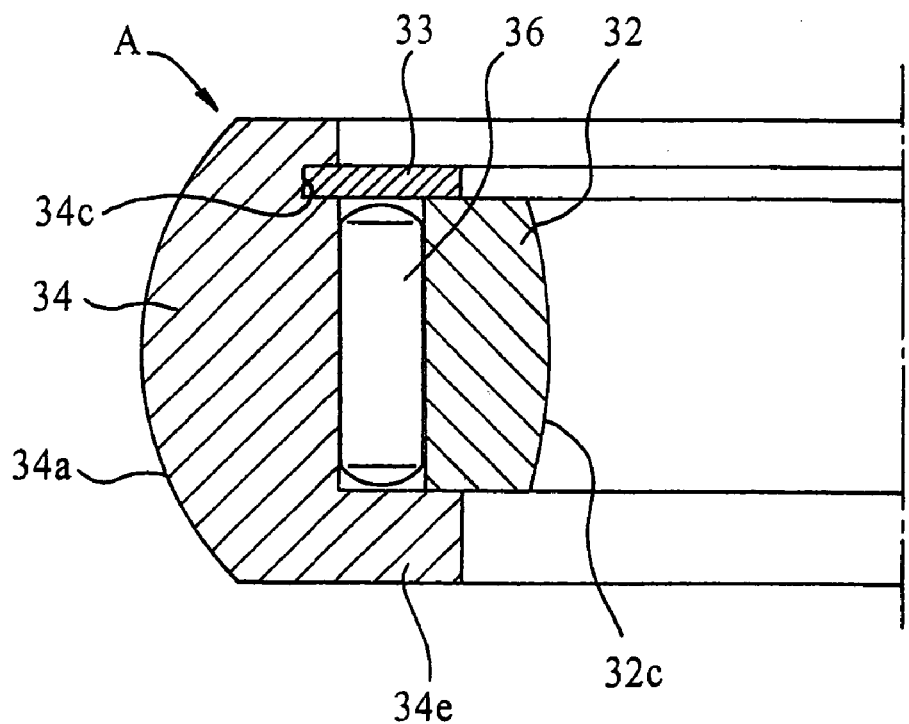
FIG. 21 is an enlarged partial sectional view showing another configuration of the roller assembly.

Alternatively, the roller assemblies A may adopt the structure shown in FIG. 21. In this example, one of the lock means in a roller assembly A consists of the lock ring 33, and the other consists of a lock collar 34e. The lock ring 33 is attached by fitting to a circumferential groove 34c formed in one of the bore ends of the roller 34. The lock collar 34e is arranged integrally on the other end of the roller 34. As compared with the structure shown in FIG. 20, there is an advantage that assembling tolerance due to the lock-ring constitution of the other lock means can be eliminated to reduce the axial clearances to the support ring 32 and the needle rollers 36 by half.

In a longitudinal section {FIG. 16(A)}, the outer peripheries 22a of the trunnions 22 have a straight shape parallel to the axes of the trunnions 22. In a cross section {FIG. 16(B)}, the outer peripheries have the shape of an ellipse whose major axis is perpendicular to the axis of the joint. The cross sections of the trunnions are generally elliptic, with a reduction in thickness as seen in the axial direction of the tripod member 20. In other words, each trunnion has such a cross-sectional shape that the faces opposed to each other in the axial direction of the tripod member retreat toward each other, i.e., to smaller diameters than the diameter of the imaginary cylindrical surface.

The inner peripheries 32c of the support rings 32 have an arcuate and convex section. That is, the generator to the inner peripheries 32c is a convex arc having a radius of r {FIG. 16 (C)}. This combines with the above-described general elliptic cross sections of the trunnions 22 and the provision of predetermined clearances between the trunnions 22 and the support rings 32, to make the support rings 32 movable along the axial directions of the trunnions 22 as well as capable of tilting movements with respect to the trunnions 22. Besides, as described above, the support rings 32 and the rollers 34 are assembled via the needle rollers 36 so as to be capable of relative rotations (the roller assemblies A). Therefore, the support rings 32 and rollers 34 are capable of unitary tilting movements with respect to the trunnions 22. Here, the term "tilting movements" refers to the tilts the axes of the support rings 32 and rollers 34 (the axes of the roller assemblies A) make with respect to the axes of the trunnions 22, within the planes containing the axes of the trunnions 22.

As described above, in the constant velocity universal joint of this embodiment, the trunnions 22 have the generally elliptic cross sections, and the inner peripheries 32c of the support rings 32 have the arcuate convex cross sections. Thus, the contacting ellipses therebetween approach points as shown by the broken line in FIG. 16(C), with a reduction in area at the same time. As a result, the forces to tilt the roller assemblies A decrease greatly as compared to the conventional ones, whereby the rollers 34 further improve in orientation stability.

Figure 22:
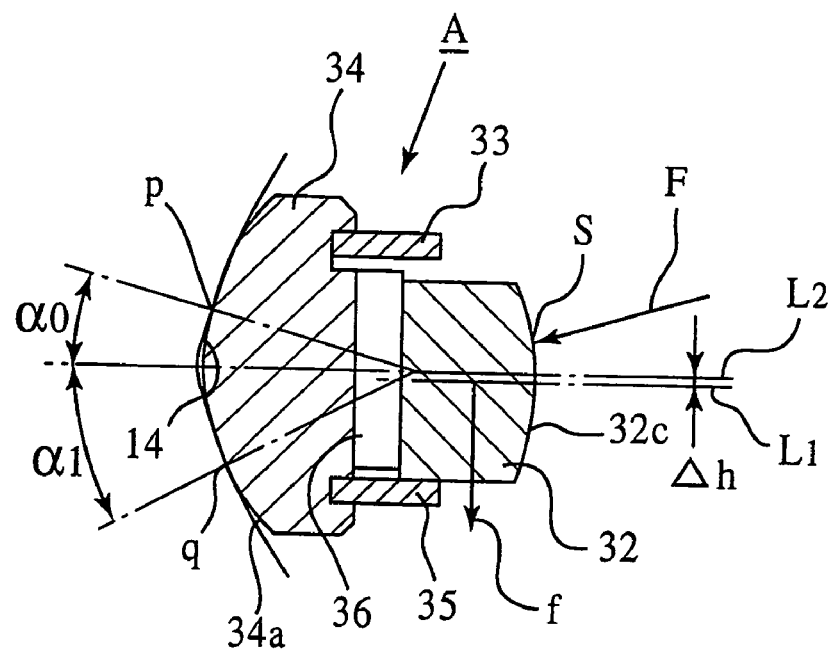
FIG. 22 is a partial sectional view showing the tilt suppressing means in the tripod type constant velocity universal joint of FIGS. 16(A)-16(C)

Furthermore, in this embodiment, tilt suppressing means as magnified in FIG. 22 are provided. More specifically, the outer periphery 34a of a roller 34 and a roller guideway 14 are brought into angular contact at two points p and q. The contact angle $\alpha_1$ at the angular contact point q on the trunnion-bottom side is made greater than the contact angle $\alpha_0$ at the angular contact point p on the trunnion-extremity side ($\alpha_1 > \alpha_0$). According to this configuration, since the outer peripheries 34a of the rollers 34 and the roller guideways 14 are in angular contact with each other at pairs of points p and q, the roller assemblies A are stabilized in orientation with respect to the roller guideways 14. In addition, since the contact angle $\alpha_1$ is greater than the contact angle $\alpha_0$, the inward components f can be exerted higher at the angular contact points q on the trunnion-bottom sides. Accordingly, the tilts of the roller assemblies A within the plane of the diagram (within the cross section perpendicular to the joint axis) are suppressed to ensure smooth rolling of the rollers 34.

Figure 23:
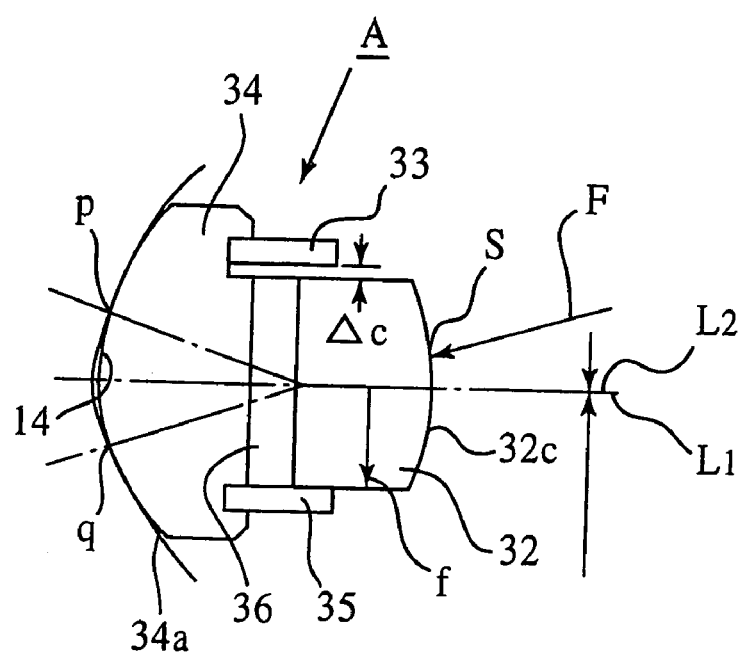
FIG. 23 is a partial sectional view showing the tilt suppressing means in a tripod type constant velocity universal joint according to a six embodiment of the present invention.
Figure 24:
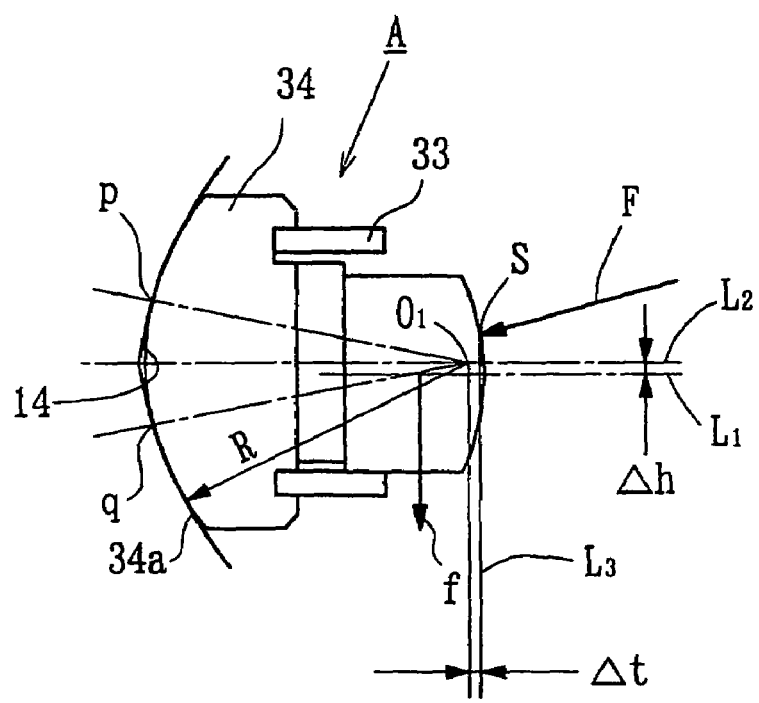
FIG. 24 is a partial sectional view showing the tilt suppressing means in a tripod type constant velocity universal joint according to a seventh embodiment of the present invention.
Figure 25:
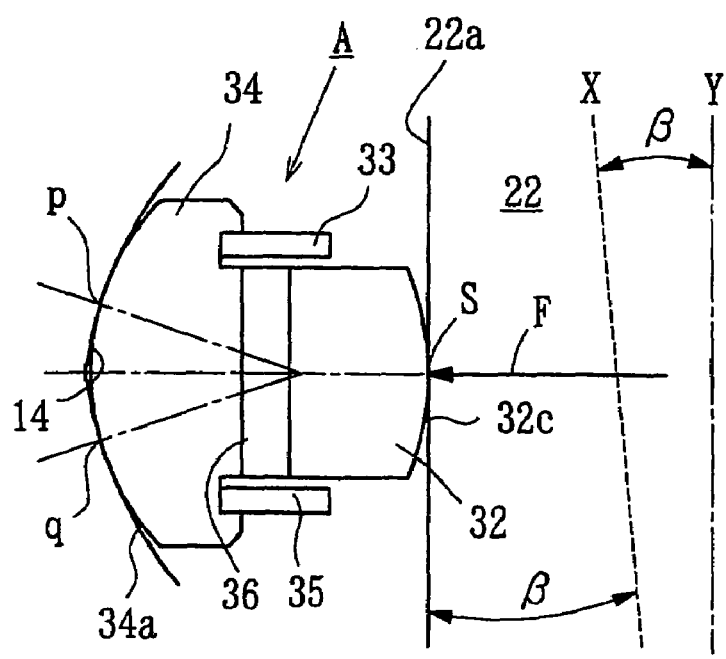
FIG. 25 is a partial sectional view showing the tilt suppressing means in a tripod type constant velocity universal joint according to an eighth embodiment of the present invention.
Figure 26:
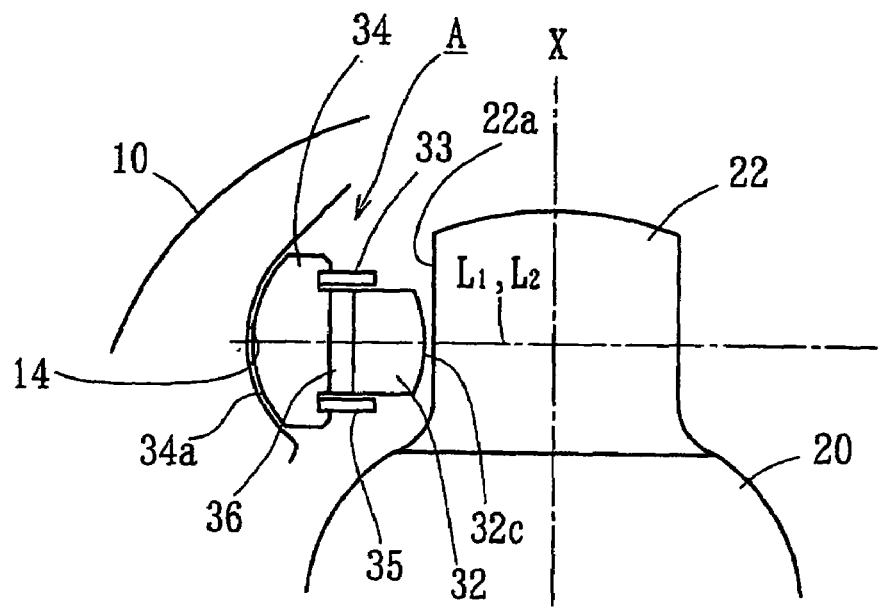
FIG. 26 is a partial sectional view showing a joint under no load.
Figure 27:
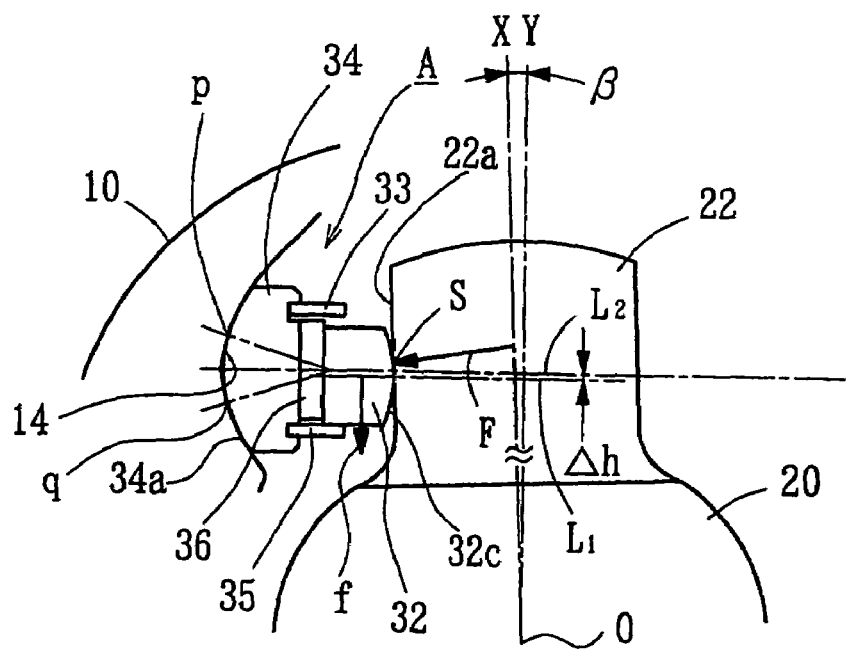
FIG. 27 is a partial sectional view explaining the production of an inward component.

FIGS. 23-25 show under magnification the tilt suppressing means of tripod type constant velocity universal joints according to sixth to eighth embodiments. Incidentally, the other configurations of the tripod type constant velocity universal joints according to the sixth to eighth embodiments are identical to those of the tripod type constant velocity universal joint according to the fifth embodiment. Thus, description thereof will be omitted.

The tilt suppressing means according to the sixth embodiment shown in FIG. 23 are the establishment of coincidence between a center line L2 passing through the center of curvature of the outer periphery 34a of a roller 34 and a center line L1 passing through the center of curvature of the inner periphery 32c of a support ring 32 when the support ring 32 makes a relative shift to the trunnion-bottom side with respect to the roller 34 due to clearances between parts that constitute the roller assembly A, or in this example, the axial clearances between the support ring 32 and the lock rings 33 and 35. This configuration can be realized, for example, by shifting the center line L1 of the support ring 32 h off the axial center (the axial center of the support ring 32) toward the trunnion bottom. This configuration reduces the inward component f. As a result, the tilts of the roller assembly A within the plane of the diagram (within the cross section perpendicular to the joint axis) are suppressed to ensure smooth rolling of the roller 34.

The tilt suppressing means according to the seventh embodiment shown in FIG. 24 are the outer periphery 34a of a roller 34, shaped into an arcuate convex section of R in radius, with the center of curvature O1 in the vicinity of a line L3 that is parallel to the axis of the roller 34 and passes through the contact portions. In this configuration, the contact portion S, or the point of application of the inward component f, and the center of curvature O1 of the outer periphery 34a of the roller 34, or the fulcrum of the tilts of the roller assembly A, are brought near to each other in the radial direction of the roller assembly A (clearance .t). This reduces the tilting moment acting on the roller assembly A. Accordingly, the tilts of the roller assembly A within the plane of the diagram (within the cross section perpendicular to the joint axis) are suppressed to ensure smooth rolling of the roller 34. In this connection, the center of curvature O1 of the outer periphery 34a of the roller 34 may be set on the line L3 (.t=0).

The tilt suppressing means according to the eighth embodiment shown in FIG. 25 are the outer periphery 22a of a trunnion 22, inclined so as to spread out toward the bottom side in a longitudinal section. In the example shown in the diagram, the inclination of the outer periphery 22a is set at such an angle that the outer periphery 22a becomes parallel to the axis Y of the roller assembly A when the axis X of the trunnion 22 tilts by an angle . with respect to the axis Y of the roller assembly A in the above-described manner. That is, the inclination is set at the same angle (.) as the tilt angle . of the trunnion 22. This configuration eliminates the difference between the direction of the applied load F and the direction of the torque transfer, thereby precluding the production of the inward component f. As a result, the tilts of the roller assembly A within the plane of the diagram (within the cross section perpendicular to the joint axis) are suppressed to ensure smooth rolling of the roller 34. In this connection, even when the inclination of the outer periphery 22a is set below ., a certain effect can be expected in reducing the inward component f and thereby suppressing the tilts of the roller assembly A.

While the tripod type constant velocity universal joints according to the fifth through eighth embodiments described above have employed the respective tilt suppressing means (FIGS. 22-25) by themselves, two or more types of tilt suppressing means may be used in combination.

Figure 19:
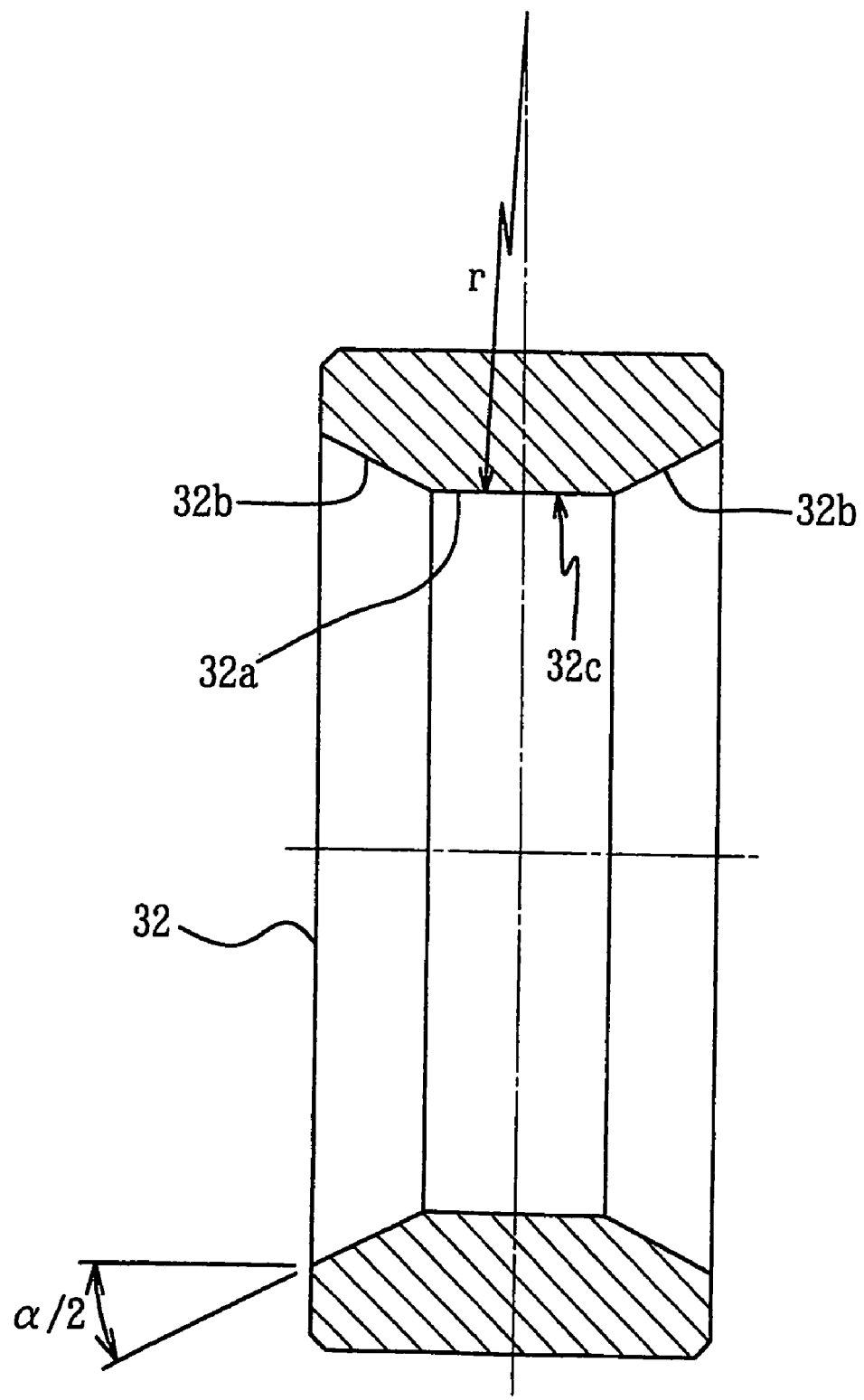
FIG. 19 is an enlarged sectional view of a support ring in FIGS. 18(A)-18(C)

FIGS. 18(A) through 19 show a tripod type constant velocity universal joint according to a ninth embodiment of the present invention. The constant velocity universal joint of this embodiment differs from those of the above-described embodiments in that the generator to the inner peripheries 32c of the support rings 32, which has been a single arc, consists of a combination of an arc portion 32a at the center and relief portions 32b on both sides. The role of the relief portions 32b is to avoid the interference with the trunnions 22 at an operating angle (.) as shown in FIG. 18(C). Each relief portion 32b is formed by a straight or curved line that gradually spreads out from an edge of the arc portion 32a to an end of the support ring 32. The relief portions 32b illustrated here are formed by part of a conical surface having a vertex angle .=50°. The arc portions 32a have a large radius of curvature (r) on the order of e.g. 30 mm, so as to allow the trunnions 20 to tilt 2-3° or so with respect to the support rings 32. In tripod type constant velocity universal joints, one rotation of the outer joint member 10 constitutionally produces three nutations of the tripod member 20 about the center of the outer joint member 10. Here, the amount of eccentricity represented by the symbol e {FIG. 17(A)} increases in proportion to the operating angle (.). While the three trunnions 22 are spaced by 120° from one another, the presence of the operating angle (.) causes the trunnions 22 to tilt as shown in FIG. 17(B). More specifically, with reference to the vertical trunnion 22 shown to the upper in the diagram, the remaining two trunnions 22 are declined slightly from their axes at the zero operating angle, shown by the dot-dash lines. For example, an operating angle (.) of approximately 23° causes a decline of the order of 2-3°. This decline can be readily allowed by the curvature of the arc portions 32a on the inner peripheries 32c of the support rings 32. Therefore, the surface pressures at the contact portions between the trunnions 22 and the support rings 32 can be prevented from becoming excessively high. Incidentally, FIG. 17(B) is a schematic representation of the three trunnions 22 of the tripod member 20 as seen from the left side of FIG. 17(A), the full lines showing the individual trunnions. The constant velocity universal joint of this embodiment also uses tilt suppressing means identical to one of those configurations shown in FIGS. 22-25, or two or more of them in combination, so that the tilts of the roller assemblies A within the cross section perpendicular to the joint axis are suppressed to ensure smooth rolling of the rollers 34. Incidentally, the structure shown in FIG. 21 may be adopted for the locking means in the roller assemblies A.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A constant velocity universal joint comprising:
an outer joint member having three track grooves each having circumferentially-opposed roller guideways;
a tripod member having three radially-projecting trunnions;
rollers inserted into said track grooves; and
rings fitted onto said trunnions for supporting said rollers rotatably, wherein said rings have a circular cross section and said trunnions are so shaped in cross section as to contact inner peripheries of said rings in directions perpendicular to an axis of the joint and create clearances with the inner peripheries of said rings in the axial direction of the joint;
said rollers being capable of moving along said roller guideways in the axial direction of said outer joint member, wherein
the ratio of the pitch circle diameter $T_{PCD}$ of said track grooves to the pitch circle diameter $S_{PCD}$ of a spline hole formed in said tripod member, or $T_{PCD}/S_{PCD}$, is set within the range of 1.7-2.1,
the ratio of the diameter $D_J$ of said trunnions to the pitch circle diameter $S_{PCD}$ of said spline hole, or $D_J/S_{PCD}$, is set within the range of 0.6-1.0, and
the ratio of the outer diameter $D_R$ of said rollers to the pitch circle diameter $S_{PCD}$ of said spline hole, or $D_R/S_{PCD}$, is set within the range of 1.4-2.3.

2. The constant velocity universal joint according to claim 1, wherein:
the ratio $T_{PCD}/S_{PCD}$ is set within the range of 1.72-2.10;
the ratio of the dimension $D_{JL}$ of said trunnions in the directions perpendicular to the axis of the joint to the pitch circle diameter $S_{PCD}$ of said spline hole, or $D_{JL}/S_{PCD}$, is set within the range of 0.63-0.94; and
the ratio $D_R/S_{PCD}$ is set within the range of 1.47-2.21.

3. The constant velocity universal joint according to claim 1, wherein the ratio of the outer diameter $D_O$ of said outer joint member to the pitch circle diameter $S_{PCD}$ of said spline hole, or $D_O/S_{PCD}$, is set within the range of 2.78-3.77.

4. The constant velocity universal joint according to claim 1, wherein the ratio of the barrel width $H_T$ of said tripod member to the pitch circle diameter $S_{PCD}$ of said spline hole, or $H_T/S_{PCD}$, is set within the range of 0.81-1.22.

5. The constant velocity universal joint according to claim 1, wherein the ratio of the width $H_R$ of said rollers to the pitch circle diameter $S_{PCD}$ of said spline hole, or $H_R/S_{PCD}$, is set within the range of 0.38-0.67.

6. The constant velocity universal joint according to claim 1, wherein the ratio of the radius of curvature $R_R$ of the outer peripheries of said rollers to the pitch circle diameter $S_{PCD}$ of said spline hole, or $R_R/S_{PCD}$, is set within the range of 0.19-1.11.

* * * * *